US012527753B2

(12) United States Patent
Thoene et al.

(10) Patent No.: US 12,527,753 B2
(45) Date of Patent: Jan. 20, 2026

(54) CYSTEAMINE FOR THE TREATMENT, MITIGATION AND PREVENTION OF CORONAVIRAL, E.G., SARS-COV-2, INFECTIONS

(71) Applicant: The Regents of the University of Michigan, Ann Arbor, MI (US)

(72) Inventors: Jess Thoene, Ann Arbor, MI (US); Robert Gavin, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 1130 days.

(21) Appl. No.: 17/476,192

(22) Filed: Sep. 15, 2021

(65) Prior Publication Data

US 2022/0000808 A1 Jan. 6, 2022

Related U.S. Application Data

(63) Continuation-in-part of application No. PCT/US2021/031987, filed on May 12, 2021.
(Continued)

(51) Int. Cl.
*A61K 31/145* (2006.01)
*A61K 9/00* (2006.01)
(Continued)

(52) U.S. Cl.
CPC .......... *A61K 31/145* (2013.01); *A61K 9/0043* (2013.01); *A61K 9/0053* (2013.01);
(Continued)

(58) Field of Classification Search
CPC .. A61K 31/145; A61K 9/0043; A61K 9/0053; A61K 31/4045; A61K 31/427;
(Continued)

(56) References Cited

U.S. PATENT DOCUMENTS

| | | |
|---|---|---|
| 5,554,655 A | 9/1996 | Thoene |
| 2007/0135525 A1 | 6/2007 | Liang et al. |

(Continued)

FOREIGN PATENT DOCUMENTS

| | | | |
|---|---|---|---|
| CN | 111081316 A | * | 4/2020 |
| KR | 20080077658 A | | 8/2008 |

(Continued)

OTHER PUBLICATIONS

Goudar, Vedavati, Kanthesh M. Basalingappa, and Nagalambika Prasad. "Covid-19: A Review on Corona Virus." International Journal of Innovative Medicine and Health Science 12 (2020): 5-12 (Year: 2020).*

(Continued)

*Primary Examiner* — James H Alstrum-Acevedo
*Assistant Examiner* — Justin Christopher Sanchez
(74) *Attorney, Agent, or Firm* — McCoy Russell LLP

(57) ABSTRACT

Provided herein are methods for the treatment, mitigation, and prevention of viral infections (e.g., coronavirus infections (e.g., severe acute respiratory syndrome coronavirus 2 (SARS-CoV-2), etc.), etc.) and diseases (e.g., Coronavirus disease 2019 (COVID-19)) associated therewith by the administration of cysteamine or derivatives thereof to a subject.

66 Claims, 6 Drawing Sheets
(6 of 6 Drawing Sheet(s) Filed in Color)

Related U.S. Application Data

(60) Provisional application No. 63/024,974, filed on May 14, 2020, provisional application No. 63/024,284, filed on May 13, 2020.

(51) Int. Cl.

| | |
|---|---|
| ***A61K 31/4045*** | (2006.01) |
| ***A61K 31/427*** | (2006.01) |
| ***A61K 31/4706*** | (2006.01) |
| ***A61K 31/4965*** | (2006.01) |
| ***A61K 31/513*** | (2006.01) |
| ***A61K 31/661*** | (2006.01) |
| ***A61K 31/675*** | (2006.01) |
| ***A61P 31/14*** | (2006.01) |

(52) U.S. Cl.
CPC ........ *A61K 31/4045* (2013.01); *A61K 31/427* (2013.01); *A61K 31/4706* (2013.01); *A61K 31/4965* (2013.01); *A61K 31/513* (2013.01); *A61K 31/661* (2013.01); *A61K 31/675* (2013.01); *A61P 31/14* (2018.01)

(58) Field of Classification Search
CPC ............ A61K 31/4706; A61K 31/4965; A61K 31/513; A61K 31/661; A61K 31/675; A61P 31/14
See application file for complete search history.

(56) References Cited

U.S. PATENT DOCUMENTS

| | | | |
|---|---|---|---|
| 2012/0129946 | A1 | 5/2012 | Thoene |
| 2014/0005068 | A1 | 1/2014 | Das et al. |
| 2018/0003712 | A1 | 1/2018 | Haam et al. |
| 2020/0071361 | A1 | 3/2020 | Steckbeck |

FOREIGN PATENT DOCUMENTS

| | | | | |
|---|---|---|---|---|
| WO | WO-2007062272 A1 * | 5/2007 | ............. A61K 31/13 |
| WO | WO-2009064457 A2 * | 5/2009 | ........... A61K 31/341 |
| WO | WO2021217221 A1 | 11/2021 | |

OTHER PUBLICATIONS

Peng Lihong; Yang Jialiang; Tian Geng; Dong Ruyi; Lu Qingqing; Lang Jidong; Liang Lebin. "Method and device for screening candidate drugs for COVID-19." (Year: 2020).*

Box, The Best Face and Body Skin-Care Products for 2020, Apr. 17, 2020, retrieved on Jul. 15, 2021 from https://www.shape.com/lifestyle/beauty-style/best-skin-care-products-2020?, 2 pages.

Kandeel et al., Virtual screening and repurposing of FDA approved drugs against COVID-19 main protease, Life Sciences, Apr. 3, 2020, vol. 251, No. 117627, p. 1-5.

McIntosh, NovaBiotics announces fast-track repurposing of its experimental drug Nylexa for COVID-19 trials and plans for earliest possible compassionate use—Novabiotics, Apr. 13, 2020, Retrieved from the Internet: URL:https://novabiotics.co.uk/novabiotics-announces-fast-track-repurposing-of-its-experimental-drug-nylexa-for-covid-19-trials-and-plans-for-earliest-possible-compassionate-use/.

National Instututes of Health, Therapeutic Options Under Investigation | Coronavirus Disease COVID-19, Apr. 21, 2020, p. 1, Retrieved from the Internet: URL:https://web.archive.org/web/20200421163941/https://covid19treatmentguidelines.nih.gov/therapeutic-options-under-investigation/.

Thoene et al., In vitro activity of cysteamine against SARS-CoV-2 variants, Molecular Genetics and Metabolism, Sep. 2022, vol. 137, p. 192-200.

Gao et al., Factors infuencing drug deposition in the nasal cavity upon delivery via nasal sprays, Journal of Pharmaceutical Investigation, Apr. 2020, vol. 50, p. 251-259.

Kumar et al., Nasal Gel Formulation: A Review, The Global Journal of Pharmaceutical Research, Jul. 2012, vol. 1, No. 3, 9 pages.

Renaissance Lakewood, LLC, Nasal spray development: Formulation and device considerations, Oct. 6, 2022, Retrieved from: https://www.renpharm.com/nasal-spray-development/.

* cited by examiner

CYSTEAMINE FOR THE TREATMENT, MITIGATION AND PREVENTION OF CORONAVIRAL, E.G., SARS-COV-2, INFECTIONS

CROSS-REFERENCE TO RELATED APPLICATIONS

This application is a continuation-in-part application of application Ser. No. PCT/US2021/031987 filed on May 12, 2021, which application, pursuant to 35 U.S.C. § 119 (e), claims priority to the filing dates of U.S. Provisional Patent Application Ser. No. 63/024,284 filed May 13, 2020, and U.S. Provisional Patent Application Ser. No. 63/024,974 filed May 14, 2020, the disclosures of which applications are incorporated herein by reference in its entirety.

FIELD

Provided herein are methods for the treatment, mitigation, and prevention of viral infections (e.g., coronavirus infections (e.g., severe acute respiratory syndrome coronavirus 2 (SARS-CoV-2), etc.), etc.) and diseases (e.g., Coronavirus disease 2019 (COVID-19)) associated therewith by the administration of cysteamine or derivatives thereof to a subject.

BACKGROUND

Coronavirus disease-2019 (COVID-19), secondary to the severe acute respiratory syndrome coronavirus-2 (SARS-CoV-2), represents an emergent threat to public health, with a quoted mortality rate among inpatients greater than 25%. Containment strategies have been employed to varying degrees and effects in Western nations, now necessitating mitigation strategies in overwhelmed hospitals to effectively address COVID-19. Limited intensive care unit—(ICU) level resources such as mechanical ventilation and other in-hospital resources such as bedding space have played a significant role in the poor clinical outcomes associated with COVID-19.

SUMMARY

Provided herein are methods for the treatment, mitigation, and prevention of viral infections (e.g., coronavirus infections (e.g., severe acute respiratory syndrome coronavirus 2 (SARS-CoV-2), etc.), etc.) and diseases (e.g., Coronavirus disease 2019 (COVID-19)) associated therewith by the administration of cysteamine or derivatives thereof to a subject. Coronaviruses that may be targeted via delivery of a cysteamine active agent to a topical aerodigestive location may vary, where such coronaviruses may have proteins that are employed during infection, e.g., spike proteins, having disulfide bonds that can be cleaved by the cysteamine active agent, thereby at least reducing if not eliminating the ability of the coronavirus to infect a cell. Such coronaviruses include, but are not limited to: SARS-CoV-2, SARS, MERS, and the like. Coronaviruses targeted by topical administration of a cysteamine active agent to a topical aerodigestive location include any variants of such coronavirus. For example, where the target coronavirus is SARS-CoV-2, variants that may targeted include, but are not limited to: Alpha (B.1.1.7), Beta (B.1.351, B.1.351.2, B.1.351.3), Delta (B.1.617.2, AY.1, AY.2, AY.3, AY.4, AY.5, AY.6, AY.7, AY.8, AY.9, AY.10, AY.11, AY.12), Gamma (P.1, P.1.1, P.1.2), Eta (B.1.526), Kappa (B.1.617.1), B.1.617.3, and the like.

In some embodiments, provided herein are methods of treating a subject infected with severe acute respiratory syndrome coronavirus 2 (SARS-CoV-2) comprising administering an effective dose of cysteamine to the subject. In some embodiments, the subject suffers from Coronavirus disease 2019 (COVID-19).

In some embodiments, provided herein is the use of an effective dose of cysteamine for treating a subject infected with severe acute respiratory syndrome coronavirus 2 (SARS-CoV-2).

In some embodiments, provided herein is the use of an effective dose of cysteamine in the manufacture of a medicament for use in a method of treating a subject infected with severe acute respiratory syndrome coronavirus 2 (SARS-CoV-2).

In some embodiments, provided herein are methods of treating a subject infected with severe acute respiratory syndrome coronavirus 2 (SARS-CoV-2) comprising administering cysteamine to the subject.

In some embodiments, provided herein are methods of preventing a subject from becoming infected with severe acute respiratory syndrome coronavirus 2 (SARS-CoV-2), comprising administering cysteamine to the subject (e.g., by way of intranasal, bronchial, or systemic administration).

In some embodiments, provided herein is the use of an effective dose of cysteamine for preventing infection of a subject with severe acute respiratory syndrome coronavirus 2 (SARS-CoV-2).

In some embodiments, provided herein is the use of an effective dose of cysteamine in the manufacture of a medicament for use in a method of preventing a subject from being infected with severe acute respiratory syndrome coronavirus 2 (SARS-CoV-2).

In some embodiments, the subject suffers from mild COVID-19. In some embodiments, the subject suffers from moderate COVID-19. In some embodiments, the subject suffers from severe COVID-19. In some embodiments, the effective dose (e.g., oral dose, etc.) comprises 10-500 mg of cysteamine (e.g., 10 mg, 20 mg, 30 mg, 40 mg, 50 mg, 60 mg, 70 mg, 80 mg, 90 mg, 100 mg, 150 mg, 200 mg, 250 mg, 300 mg, 400 mg, 500 mg, or ranges therebetween (e.g., 25-150 mg of cysteamine, etc.), etc. In some embodiments, cysteamine is administered daily, twice daily, thrice daily, on alternate days, etc. In some embodiments, cysteamine is administered orally, intravenously, or by another suitable route of administration. In some embodiments, the effective dose (e.g., parenteral dose (e.g., IV dose, etc.)) comprises 25-250 mg/kg/day of cysteamine (e.g., 25 mg/kg/day, 50 mg/kg/day, 75 mg/kg/day, 100 mg/kg/day, 150 mg/kg/day, 200 mg/kg/day, 250 mg/kg/day, or ranges therebetween (e.g., 50-150 mg/kg/day, etc.)). In some embodiments, the daily oral or intravenous dose does not exceed 20 g/day of cysteamine (e.g., ≤2 g, ≤3 g, ≤4 g, ≤5 g, ≤6 g, ≤7 g, ≤8 g, ≤9 g, ≤10 g≤20 g). In some embodiments, the subject is first administered an initial dose (e.g., 25 mg/kg/day, 20 mg, etc.) and doses are subsequently increased (e.g., by 10 mg/kg/day, by 25 mg/dose, etc.) to an effective dose.

In some embodiments, the cysteamine is co-administered with one or more additional therapeutics. In some embodiments, the cysteamine is co-administered with one or more antiviral agents. In some embodiments, the cysteamine is co-administered with one or more of lopinavir and ritonavir, umifenovir, hydroxychloroquine, remdesivir and favipiravir.

In some embodiments, provided herein are methods comprising: (a) testing a subject or a biological sample from a subject to determine the appropriateness of cysteamine administration to treat/prevent COVID-19; and (b) administering a dose of cysteamine consistent with the methods described herein. In some embodiments, testing comprises a PCR-based test to determine whether the subject is infected with SARS-CoV-2. In some embodiments, methods further comprise: (c) testing a subject or a biological sample from a subject to determine the effectiveness of the cysteamine administration. In some embodiments, methods further comprise: (d) determining a treatment course of action based on the testing of step (a) and/or step (c).

In some embodiments, provided herein are methods of altering the structure of SARS-CoV-2 spike protein comprising contacting the spike protein with cysteamine. In some embodiments, the spike protein is present on the surface of a SARS-CoV-2 viral particle. In some embodiments, the SARS-CoV-2 viral particle is present within a human subject. In some embodiments, contacting the spike protein with cysteamine results in reduction of one or more disulfide bonds within the spike protein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DEFINITIONS

Figure 1:
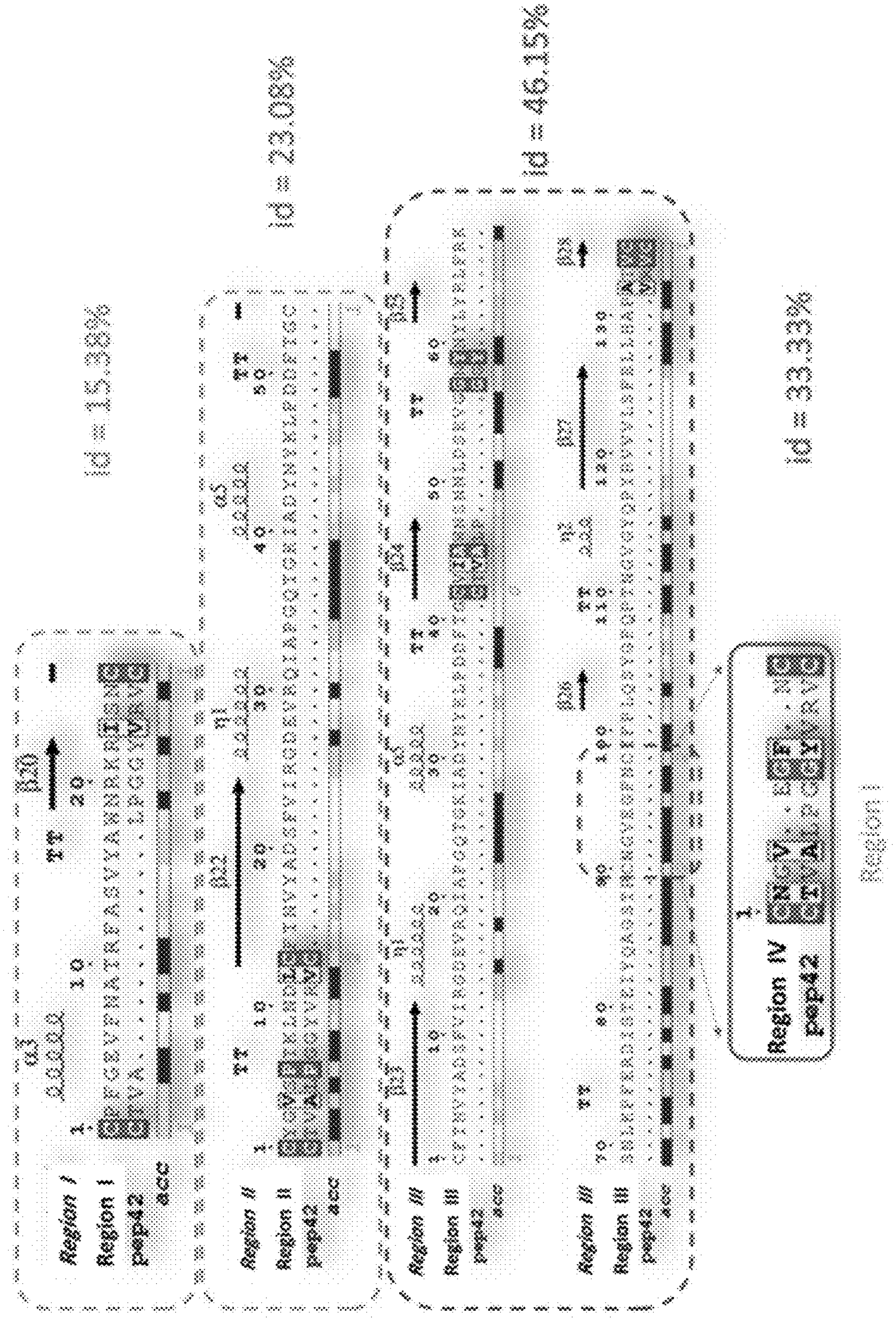
FIG. 1. Multiple Sequence Alignment (MSA) of the spike proteins of seven human coronaviruses (229E, NL63, OC43, HKU1, SARS, MERS, and COVID-19).

Although any methods and materials similar or equivalent to those described herein can be used in the practice or testing of embodiments described herein, some preferred methods, compositions, devices, and materials are described herein. However, before the present materials and methods are described, it is to be understood that this invention is not limited to the particular molecules, compositions, methodologies, or protocols herein described, as these may vary in accordance with routine experimentation and optimization. It is also to be understood that the terminology used in the description is for the purpose of describing the particular versions or embodiments only, and is not intended to limit the scope of the embodiments described herein.

Unless otherwise defined, all technical and scientific terms used herein have the same meaning as commonly understood by one of ordinary skill in the art to which this invention belongs. However, in case of conflict, the present specification, including definitions, will control. Accordingly, in the context of the embodiments described herein, the following definitions apply.

As used herein and in the appended claims, the singular forms "a", "an" and "the" include plural reference unless the context clearly dictates otherwise. Thus, for example, reference to "a therapeutic" is a reference to one or more therapeutics and equivalents thereof known to those skilled in the art, and so forth.

As used herein, the term "comprise" and linguistic variations thereof denote the presence of recited feature(s), element(s), method step(s), etc. without the exclusion of the presence of additional feature(s), element(s), method step(s), etc. Conversely, the term "consisting of" and linguistic variations thereof, denotes the presence of recited feature(s), element(s), method step(s), etc. and excludes any unrecited feature(s), element(s), method step(s), etc., except for ordinarily-associated impurities. The phrase "consisting essentially of" denotes the recited feature(s), element(s), method step(s), etc. and any additional feature(s), element(s), method step(s), etc. that do not materially affect the basic nature of the composition, system, or method. Many embodiments herein are described using open "comprising" language. Such embodiments encompass multiple closed "consisting of" and/or "consisting essentially of" embodiments, which may alternatively be claimed or described using such language.

As used herein, the term "subject" broadly refers to any animal, including but not limited to, human and non-human animals (e.g., dogs, cats, cows, horses, sheep, poultry, fish, crustaceans, etc.). As used herein, the term "patient" typically refers to a subject that is being treated for a disease or condition.

As used herein, the terms "administration" and "administering" refer to the act of giving a drug, prodrug, or other agent, or therapeutic treatment to a subject or in vivo, in vitro, or ex vivo cells, tissues, and organs. Exemplary routes of administration to the human body can be by oral administration, parenteral administration (e.g., intravenously, subcutaneously, etc.), etc.

As used herein, the term "effective amount" refers to the amount of a composition sufficient to effect beneficial or desired results. An effective amount can be administered in one or more administrations, applications or dosages and is not intended to be limited to a particular formulation or administration route.

As used herein, the terms "co-administration" and "co-administering" refer to the administration of at least two agent(s) (e.g., cysteamine and one or more additional therapeutics) or therapies to a subject. In some embodiments, the co-administration of two or more agents or therapies is concurrent (e.g., in a single formulation/composition or in separate formulations/compositions). In other embodiments, a first agent/therapy is administered prior to a second agent/therapy. Those of skill in the art understand that the formulations and/or routes of administration of the various agents or therapies used may vary. The appropriate dosage for co-administration can be readily determined by one skilled in the art. In some embodiments, when agents or therapies are co-administered, the respective agents or therapies are administered at lower dosages than appropriate for their administration alone. Thus, co-administration is especially desirable in embodiments where the co-administration of the agents or therapies lowers the requisite dosage of a potentially harmful (e.g., toxic) agent(s), and/or when co-administration of two or more agents results in sensitization of a subject to beneficial effects of one of the agents via co-administration of the other agent.

As used herein, the term "pharmaceutical composition" refers to the combination of an active agent with a carrier, inert or active, making the composition especially suitable for diagnostic or therapeutic use in vitro, in vivo or ex vivo.

The terms "pharmaceutically acceptable" or "pharmacologically acceptable," as used herein, refer to compositions that do not substantially produce adverse reactions, e.g., toxic, allergic, or immunological reactions, when administered to a subject.

As used herein, the term "instructions for administering," and grammatical equivalents thereof, includes instructions for using the compositions contained in a kit for the treatment of conditions (e.g., providing dosing, route of administration, decision trees for treating physicians for correlating patient-specific characteristics with therapeutic courses of action).

As used herein, the term "sample" is used in its broadest sense. In one sense, it is meant to include a specimen or culture obtained from any source, as well as biological and environmental samples. Biological samples may be obtained from animals (including humans) and encompass fluids, solids, tissues, and gases. Suitable samples that may find use in embodiments herein include, but are not limited to: blood, plasma, sera, urine, saliva, cells, cell lysates, tissues, tissue homogenates, purified nucleic acids, stool, vaginal secretions, cerebrospinal fluid, allantoic fluid, water, biofilm, soil, dust, food, beverage, agriculture products, plants, etc.

DETAILED DESCRIPTION

Provided herein are methods for the treatment, mitigation, and prevention of viral infections (e.g., coronavirus infections (e.g., severe acute respiratory syndrome coronavirus 2 (SARS-CoV-2), etc.), etc.) and diseases (e.g., Coronavirus disease 2019 (COVID-19)) associated therewith by the administration of cysteamine or derivatives thereof to a subject.

Cysteamine (2-aminoethanethiol) is an FDA-approved orphan drug for the treatment of cystinosis. It has demonstrated in vitro activity against the human immunodeficiency virus (HIV), reducing the disulfide bonds in HIV glycoprotein 120 (GP 120) and thereby inhibiting viral spread (See, U.S. Pat. No. 5,646,189; incorporated by reference in its entirety). In vitro studies of cysteamine against HIV showed 100% inhibition of cytotoxicity at 100 μM concentration (See, U.S. Pat. No. 5,554,655; incorporated by reference in its entirety). The assay of cysteamine and cystamine was performed using the CEM human T-lymphocyte cell line as host cells, and the HTLV-$III_B$ strain of HIV-1 as the challenge virus. In some embodiments, various cysteamine-related compounds may find use in any embodiments described herein for cysteamine. Suitable cysteamine-related compounds for use in any embodiments herein include cysteamine, cystamine, phosphocysteamine, pharmaceutically acceptable salts thereof, all the hydrated forms of these compounds as well as the anhydrous forms.

Multiple Sequence Alignment (MSA) was performed between the seven human coronaviruses (229E, NL63, 0C43, HKU1, SARS, MERS, and COVID-19) spike proteins (alignment performed by Clustal Omega web server and visualized by ESpript software). FIG. 1 highlights results of the analysis (from 'COVID-19 Spike-host cell receptor GRP78 binding site prediction' Ibrahim Ibrahim, Doaa Abdelmalek, Mohamed Elshahat, Abdo Elfiky; DOI: 10.21203/rs.2.24599/v1; incorporated by reference in its entirety). The secondary structure for the COVID-19 spike model is displayed at the top of the MSA, and residual surface accessibility is present at the bottom. Alpha helices are shown by helix while arrows show beta-sheets on the top of the MSA. The residues that are surface accessible are in blue, while buried residues are in white at the bottom of the MSA. Identical residues are highlighted in red, while similar residues are highlighted in yellow. The positions of the disulfide bonds are marked by the green numbers below the accessibility rows in the MSA. 13 disulfide bonds are found in the spike protein from which we predict four regions to be the binding site with cell surface GRP78. These four regions of the spike protein, identified with the disulfides numbers 3, 4, 5, and 6 are marked in the MSA with green, blue, magenta, and red dashed lines, respectively.

The effects of cysteamine alone and in association with zidovudine or didanosine on the replication of human immunodeficiency virus type 1 (HIV-1) has been investigated (Beramini et al. J Infect Dis. 1996;174(1):214-218.; incorporated by reference in its entirety). More than 90% viral inhibition was obtained by 200 μM cysteamine in lymphocytes and 100 microM cysteamine in macrophages against 4 primary isolates and 2 laboratory strains of HIV-1. Polymerase chain reaction analysis demonstrated that cysteamine interferes with early steps of HIV-1 replication, before proviral DNA formation. The use of cysteamine in conjunction with zidovudine or didanosine brought about an additive antiviral effect without concomitant increases in toxicity. The concentrations of cysteamine that are effective against HIV-1 in vitro have been well tolerated over long periods by patients under treatment for cystinosis, an inherited disorder. These observations indicate that effective doses of cysteamine are tolerable by patients.

Thus, in some embodiments, provided herein are methods for treating/preventing SARS-CoV-2 infection and/or COVID-19 by the administration (e.g., oral, topical, IV, intranasally, intrabronchially, etc.) of an effective amount of cysteamine, cystamine, phosphocysteamine, or a pharmaceutically acceptable salt hereof. Cysteamine is a compound of the formula:

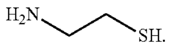

Cystamine is a compound of the formula:

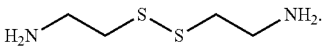

Phosphocysteamine is a compound of the formula:

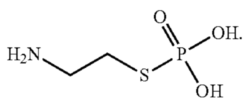

Cysteamine may be prepared from ethanolamine and carbon disulfide via 2-mercaptothiazoline (Gabriel et al, Ber., vol. 31, 2837 (1898); Knorr et al, Ber., vol. 36, 1281 (1903); and Mills, Jr. et al, J. Am. Chem. Soc., vol. 62, 1173 (1940)) or via ethyleneimine (Wenker, J. Am. Chem. Soc., vol. 57, 2328 (1935); Mills, Jr. et al, J. Am. Chem. Soc., vol. 62, 1173 (1940); and Shirley, Preparation of Organic Intermediates, Wiley, NY p. 189 (1951); incorporated by reference in their entireties).

Cystamine has the formula

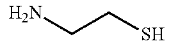

Phosphocysteamine is the phosphorothioester of cysteamine and has the formula:

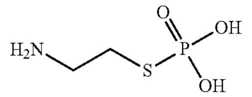

Phosphocysteamine is also known to be useful for the treatment of nephropathic cystinosis (Thoene et al, The Journal of Pediatrics, vol. 96, pp. 1043-1044 (1980); Thoene, in Cooperative Approaches to Research and Development of Orphan Drugs, Alan R. Liss, NY, pp. 157-162 (1985); and Smolin et al, Pediatric Research, vol. 23, pp. 616-620 (1988)).

Cysteamine is known to be safe for use in humans with few side-effects (usually nausea and vomiting) serious enough to require discontinuation of the drug. There is both in vitro and in vivo data on the safety of cysteamine. Studies on the effect of cysteamine on the growth rate and cloning efficiency of epithelial fibroblasts show no effect on growth rate at concentrations up to 10 μM. These in vitro experiments were performed using fibroblasts which are not protected as are cornified epithelial cells, in vivo, as found in the oral, vaginal, and anal cavities. Studies have also been performed on topical cysteamine for use in the treatment of the keratitis of cystinosis. In this formulation, aqueous cysteamine at concentrations of 0.1% and 0.5%, which correspond to 10 mM and 50 mM, respectively, were used. These concentrations are effective in reducing the cystine crystals found in the corneas of patients with nephropathic cystinosis, and the drug is well-tolerated in chronic use via this modality. Rabbit studies have shown both concentrations to be safe as evaluated via the Draize test (Kaiser-Kupfer, M. et al, Archives of Ophthalmology, vol. 108, pp. 689-693 (1990); and Kaiser-Kupfer, M. et al, New Eng. J. Med., vol. 316, pp. 775-779 (1987)).

Provided herein are compositions (e.g., comprising cysteamine) and methods (e.g., administering cysteamine or co-administering cysteamine with additional therapies) for the treatment of SARS-CoV-2 infection, COVID-19, and symptoms/conditions arising therefrom (e.g., lung damage, organ failure, etc.). In some embodiments, provided herein is the use of unit doses of cysteamine in the range of 10-250 mg, repeated at intervals (e.g., 6 hours, 12 hours, 24 hours, 48 hours, etc.) as required. In some embodiments, dose may be administered up to twenty doses (e.g., 2, 3, 4, 5, 6, 7, 8, 9, 10, 11, 12, 13, 14, 15, 16, 17, 18, 19, 20 or ranges therebetween). In some embodiments, dose administration may be continued beyond 20 doses. In some embodiments, a maximum total dose/day is, for example, 2-10 g (e.g., 2, g, 3, g, 4 g, 5 g, 6 g, 7 g, 8 g, 9 g 10 g, or more or ranges therebetween). In some embodiments, provided herein is the combination of cysteamine with antiviral drugs, other immunosuppressive therapies, etc. In some embodiments, cysteamine is administered orally, parenterally (e.g., intravenously, subcutaneously, intramuscularly, etc.), or by any suitable route of administration. In some embodiments, dosing is guided by laboratory and/or clinical studies.

In some embodiments, the compositions and methods herein find use in the treatment of a viral infection and/or diseases, conditions, or symptoms arising therefrom. In some instances, the viral target which mediates the viral infection and/or disease, condition or symptom arising therefrom is one that shows significant reliance on disulfide bonds to promote infection and spread. In some embodiments, cysteamine is administered (alone or co-administered with other agents, including but not limited to urea, guanidine or other chaotropic agents, e.g., in a nasal spray) for the treatment of a viral infection and/or diseases, conditions, or symptoms arising therefrom, e.g., SARS-CoV-2 mediated infections, diseases, conditions and/or symptoms.

In some embodiments, a subject that is infected with SARS-CoV-2 (e.g., tested positive for SARS-CoV-2) is treated with cysteamine to prevent/treat symptoms and complications resulting therefrom. In some embodiments, a subject suffers from COVID-19 as a result of a SARS-CoV-2 infection.

COVID-19 may be classified as "mild," "moderate," "severe," and "critical." A mild case of COVID-19 (which may develop into a more severe case, but might not) typically consists of a low/moderate fever, respiratory symptoms, cough, aches, and pains. An individual patient might exhibit only a subset of these symptoms. Moderate COVID-19 is defined as a subject displaying evidence of pulmonary infiltrates (by chest X-ray or CT scan), but without a need for supplemental oxygen (or more than the patient's baseline oxygen requirement if using home oxygen). Symptoms of being moderately ill with COVID-19 may include coughing, fever above 37.8° C., chills, shortness of breath, dehydration, and increased tiredness. A severe case of COVID-19 will include the preceding symptoms as well as inflammation in the lungs (e.g., leading to cytokine release), pneumonia, low oxygen levels in the blood, trouble breathing, pain or pressure in the chest, confusion, inability to arouse, difficulty eating or drinking, and bluish lips/face. A critical case of COVID-19 may include severe pneumonia, ARDS (acute respiratory distress syndrome), sepsis, and organ failure.

In some embodiments, cysteamine is administered to a subject suffering from COVID-19. In some embodiments, cysteamine is administered to a subject suffering from moderate COVID-19. In some embodiments, cysteamine is administered to a subject suffering from severe COVID-19.

In some embodiments, a subject is critically ill from COVID-19. In some embodiments, a critically ill patient exhibits one or more of ICU utilization, pneumonitis (e.g., physiologic signs of pneumonitis), bilateral infiltrates (e.g., radiographic evidence of infiltrates), respiratory failure, septic shock, increased respiratory rate (e.g., >20, >25, >30, >35, >40 per minute), low oxygen saturation (e.g., <95%, <94%, <93%, <92%, <91%, or <90% in ambient air), respiratory failure requiring mechanical ventilation, shock of any form (e.g., requiring the use of a vasopressor medication), or organ failure (e.g., multiorgan failure).

In some embodiments, a subject suffering from COVID-19 exhibits mild pneumonitis (e.g., no pulmonary infiltrates, mild symptoms, etc.).

In some embodiments, a subject has a positive test for active SARS-CoV-2 infection. In some embodiments, a subject exhibits signs/symptoms of COVID-19, such as fever (e.g., >100.4), cough, aches/pains, chills, shortness of breath, dehydration, increased tiredness.

In some embodiments, a subject is not critically ill, but at moderate to high risk of the disease advancing to ICU utilization and/or COVID-19 mortality. In some embodiments, a subject is not critically ill, but exhibits symptoms that warrant hospital admission.

In some embodiments, a subject is not critically ill, but suffering from COVID-19, exhibits pneumonitis, and is at low risk of the disease advancing to ICU utilization and/or COVID-19 mortality.

In some embodiments, provided herein are methods of preventing infection of a subject with severe acute respiratory syndrome coronavirus 2 (SARS-CoV-2) comprising administering an effective dose of cysteamine to the subject. In some embodiments, cysteamine is administered to the nasal cavity of the subject. In some embodiments, cysteamine is formulated for topical administration. In some embodiments, the topical formulation comprises a nasal cream, nasal drops, or a nasal spray. In some embodiments, administering cysteamine reduces the effectiveness of SARS-CoV-2 entering the nasal epithelium, replicating in the nasal epithelium, and/or migrating from the nasal epithelium. In some embodiments, provided herein is the use of an effective dose of cysteamine for preventing infection of a subject with severe acute respiratory syndrome coronavirus 2 (SARS-CoV-2). In some embodiments, provided herein is the use of an effective dose of cysteamine in the manufacture of a medicament for use in a method of preventing a subject from being infected with severe acute respiratory syndrome coronavirus 2 (SARS-CoV-2).

Cysteamine bitartrate immediate release is US FDA approved as Cystagon™ (Mylan Pharma) in 50 mg and 150 mg capsules. Procysbi™, the delayed release form, (Horizon) is supplied in 25 mg and 75 mg microbeads, which decreases the amount of API per unit weight, thereby increasing by 50% the number of capsules required for a given dose.

Cysteamine has been administered intravenously (Thoene, et al JCI, 1976; incorporated by reference in its entirety).

Cysteamine can be administered intrabronchially, e.g., by way of bronchial inhaler, or other means. In some embodiments, cysteamine is formulated as a liquid or micronized powder, which permit achieving very high intra-bronchial concentrations.

Cysteamine is marketed as a topical 5% cream to treat pigmentary skin lesions. In some embodiments, topical cysteamine is administered as a nasal cream, nasal drops, or nasal spray for example, to reduce the effectiveness of SARS-COV-2 in entering the nasal epthelium or replicating therein or migrating therefrom, which a recent report identifies as a prime point of entry (Sungnak, W., Huang, N., Bécavin, C. et al. SARS-COV-2 entry factors are highly expressed in nasal epithelial cells together with innate immune genes. Nat Med (2020). doi.org/10.1038/s41591-020-0868-6; incorporated by reference in its entirety).

In some embodiments, cysteamine is provided in 10-500 mg doses (e.g., 10 mg, 20 mg, 30 mg, 40 mg, 50 mg, 60 mg, 70 mg, 80 mg, 90 mg, 100 mg, 110 mg, 120 mg, 130 mg, 140 mg, 150 mg, 160 mg, 170 mg, 180 mg, 190 mg, 200 mg, 210 mg, 220 mg, 230 mg, 240 mg, 250 mg, 260 mg, 270 mg, 280 mg, 290 mg, 300 mg, 310 mg, 320 mg, 330 mg, 340 mg, 350 mg, 360 mg, 370 mg, 380 mg, 390 mg, 400 mg, 410 mg, 420 mg, 430 mg, 440 mg, 450 mg, 460 mg, 470 mg, 480 mg, 490 mg, 500 mg, and ranges therebetween (e.g., 50-150 mg)). In some embodiments, the dose is adjusted based on the effectiveness and/or side effects of initial dosing. For example, if the initial dose is/appears effective and/or side effects are/appear significant, the dose may be reduced (e.g., 10-100 mg (e.g., 10 mg, 20 mg, 30 mg, 40 mg, 50 mg, 60 mg, 70 mg, 80 mg, 90 mg, 100 mg, and ranges therebetween (e.g., 30-50 mg)). If the initial dose is/appears ineffective and/or side effects are/appear insignificant, the dose may be increased. In some embodiments, an initial dose of cysteamine is provided and ramped up to a final dose with increments of, for example, 10 mg/kg/d at intervals (e.g., 2-week intervals). In some embodiments, cysteamine is administered (e.g., daily, twice daily, thrice daily, on alternate days, weekly, etc.) for a set time span (e.g., 1 week, 2 weeks, 3 weeks, 4 weeks, or more), of until symptoms or testing demonstrate the effectiveness of the treatment.

In some embodiments, dosing is guided by clinical and/or laboratory studies. In some embodiments, cysteamine is administered as a nanowafer. Nanowafers are constructs of a suitable biocompatible polymeric material, e.g., poly(vinyl alcohol) (MW 146,000, 87-89% hydrolyzed), containing cysteamine and fabricated in poly(dimethylsiloxane) (PDMS) imprints containing vertical of 500 nm×500 nm×500 nm. Further details may be found in Marcano, D et.al. "Synergistic Cysteamine Delivery Nanowafer as an Efficacious Treatment Modality for Corneal Cystinosis," Mol. Pharmaceutics (2016) 13: 3468-3477. Embodiments of the invention further include topical delivery of a cysteamine active agent, e.g., cysteamine, cystamine or phosphocysteamine (such as described above), to an aerodigestive mucosal location of the subject. Topical delivery of a cysteamine active agent to an aerodigestive location of a subject may be employed to at least reduce, e.g., mitigate, and in some instances prevent, coronaviral infection, e.g., but at least reducing, if not preventing, infection of cells by the coronavirus, and in some instances treat a subject for a coronaviral mediated disease, e.g., Covid-19. In some instances, topical administration of a cysteamine active agent, e.g., to the nasal mucosa, may result in one or more of the following: the topically applied composition may act as a barrier, preventing infection of treated individuals; the topically applied composition may mitigate the effects of virus that are taken up by ACE2-expressing cells by inactivating virus as they are released from infected cells in the nasal epithelium, decreasing the amount of infectious virus available to travel deeper into the tracheo-bronchial tree; and by decreasing the amount of infectious virus produced in the nasal epithelium the topically applied composition may reduce the spread of virus via exhalation by treated persons.

Coronaviruses that may be targeted via delivery of a cysteamine active agent to a topical aerodigestive location may vary, where such coronaviruses may have proteins that are employed during infection, e.g., coat (such as spike) proteins, having disulfide bonds that can be cleaved by the cysteamine active agent, thereby at least reducing if not eliminating the ability of the coronavirus to infect a cell. Such coronaviruses include, but are not limited to: SARS-CoV-2, SARS, MERS, and the like. Coronaviruses targeted by topical administration of a cysteamine active agent to a topical aerodigestive location include any variants of such coronavirus. For example, where the target coronavirus is SARS-CoV-2, variants that may targeted include, but are not limited to: Alpha (B.1.1.7), Beta (B.1.351, B.1.351.2, B.1.351.3), Delta (B.1.617.2, AY.1, AY.2, AY.3, AY.4, AY.5, AY.6, AY.7, AY.8, AY.9, AY.10, AY.11, AY.12), Gamma (P.1, P.1.1, P.1.2), Eta (B.1.526), Kappa (B.1.617.1), B.1.617.3, and the like.

Aerodigestive mucosal locations to which suitable formulations are administered in embodiments of the invention include, but are not limited to, the oral cavity, pharynx, nasopharynx, and nasal cavity. In some instances, the mucosal location to which the composition is delivered is the oral cavity, i.e., mouth, which refers to the lips, the lining inside the cheeks and lips, the front two thirds of the tongue, the upper and lower gums, the floor of the mouth under the tongue, the bony roof of the mouth, and the small area behind the wisdom teeth. In some instances, the mucosal location to which the composition is delivered is the nasal cavity, which refers to the chamber above the bone that forms the roof of the mouth and curves down at the back to join the throat, where the nasal cavity is divided into two sections called nasal passages. In some instances, the mucosal location to which the composition is delivered is the pharynx, or throat, which is the passageway leading from the mouth and nose to the esophagus and larynx, and is made up of the nasopharynx, oropharynx, and laryngopharynx.

Any convenient formulation suitable for application to a target aerodigestive mucosal location may be employed. Examples of such formulations include, but are not limited to, formulations suitable for oral delivery, such as mouthwashes, gargles, oral sprays, etc., nasal delivery formulations, and the like. The concentration of cysteamine active agent in such formulations may vary as desired, where in some instances the amount ranges from 1 to 50 mM, such as 5 to 50 mM or 5 to 25 mM, e.g., 7.5 to 25 mM or 7.5 to 15 mM, e.g., 10 mM. The viscosity of the formulations may vary e.g., depending on the route of administration, e.g., oral, nasal, and in some instances the formulations may have a viscosity at 20° C. ranging from 1 to 3000 cP, e.g., 2 to 2000 cp, such as 3 to 1000 cp, e.g., 4 to 800 cp. In some embodiments, the viscosity of the formulation, e.g., oral or nasal formulations (such as described below) is chosen such that the terminal velocity of viral particles, e.g., SARSCoV-2 virions, is zero in that formulation.

Oral delivery formulations include, but are not limited to topical aqueous formulations, such as mouthwashes, gargles, and oral sprays. As the formulations are aqueous formulations, they include an amount of water, e.g., demineralized water, distilled water, deionized water, and mineral water.

In addition to the cysteamine active agent, the oral delivery formulations may include one or more pharmaceutically acceptable excipients. Such suitable pharmaceutically acceptable excipients may include, but are not limited to, surfactants, viscosity enhancers, fragrance/aroma agents, flavoring agents, sweetening agents, solvents, and their mixtures. The pharmaceutical compositions according to the embodiments of the invention may further include one or more dyes/colorants, as desired.

Suitable solvents that may be present in oral formulations of the invention include, but are not limited to, ethyl alcohol, glycerin, sorbitol, propylene glycol, polyethylene glycol, isopropyl alcohol, purified water, and mixtures thereof. While the amount of such solvents in the formulations may vary, as desired, in some instances, the solvents are used in an amount of from 5 to 45%, such as from 10 to 35% by weight of the total composition.

Suitable preservatives that may be present in oral formulations of the invention include, but are not limited to, methyl paraben, propyl paraben and salts thereof (e.g., sodium or potassium salts), sodium benzoate, citric acid, benzoic acid, butylated hydroxytoluene and butylated hydroxyanisole or mixtures thereof. While the amount of such preservatives in formulations of embodiments of the invention, when present, may vary, in some instances the preservatives are present in an amount of 0.01 to 0.50% by weight of the total composition, such as in an amount of 0.01 to 0.15% by weight of the total composition.

In some instances, the oral formulation may include a bacteriocide. Suitable bacteriocides that may be present in oral formulations of the invention include, but are not limited to, Cetylpyridinium chloride, Delmopinol, Benzalkonium chloride, Sodium bicarbonate, Chlorhexidine gluconate, Chlorhexidine digluconate, Chlorine dioxide (Sodium chlorite/Sodium chlorate), Triclosan, Polyhexamethylene biguanide chlorhydrate, Sanguinaria Canadensis, Propolis, Aloe vera, Sage (Salvia officinalis), Lemon (Citrus limon), Pine (Pinus sylvestris), Echinacea (Echinacea purpurea and angustifolia), Rathany (Krameria trianda) and Cheeseweed mallow (Malva parviflora L.). While the amount of bacteriocide in formulations of embodiments of the invention, when present, may vary, in some instances the amount is from 0.01% to 0.5% of the volume, such as from 0.02% to 0.25% of the volume.

Suitable surface-active agents that may be present in oral formulations of the invention include, but are not limited to, polyoxyethylene castor oil derivatives, polysorbate, polyexyethylene stearates, polyoxylglycerides, glyceryl monooleate, sorbic acid, butylparaben, phospholipids and mixtures thereof. While the amount of such surface-active agents in formulations of embodiments of the invention, when present, may vary, in some instances the amount of surface-active agents present in the formulation is from 0.1 to 5.0%, such as from 0.5 to 2.5% by weight of the total composition. The amount of the surface-active agent may be chosen to improve the spreading properties and minimize drying of the aqueous compositions of the present invention when it is applied inside of the mouth via spray, mouth rinse or mouthwash.

Suitable viscosity enhancers that may be present in oral formulations of the invention include, but are not limited to, glycerin, carboxymethyl cellulose, sodium carboxyl methyl cellulose (croscarmellose), carboxymethylcellulose low viscosity, dextran, cellulose and derivatives, chitosan, carbomer and mixtures thereof. While the amount of viscosity enhancers in formulations of embodiments of the invention, when present, may vary, in some instances the viscosity enhancer is present in an amount from 0.1 to 25.0%, such as 1.0 to 25.0%, such as from 10.0 to 25%, e.g., from 10.0 to 20.0% by weight of the total composition. In some instances, the amount of viscosity enhancing agent, e.g., croscarmellose, ranges from 1 to 25 mg/ml, such as 5 to 15 mg/ml.

Suitable flavoring agents that may be present in oral formulations of the invention include, but are not limited to, menthol, mint oil, eucalyptus oil, carnation oil, ginger oil, lavender oil, sweet orange oil and their mixtures. While the amount of flavoring agents in formulations of embodiments of the invention, when present, may vary, in some instances the amount is from 0.01 to 2.0%, such as from 0.05 to 1.0%, including from 0.1 to 0.5% by weight of the total composition.

Suitable fragrance/aroma agents include, but are not limited to, menthol, mint oil, emulsified mint oil, tropical fruit, watermelon, bubblegum, strawberry or berry flavor, peace and calming oil, sandal wood oil, or tangerine oil, etc.

Suitable sweetening agents that may be present in oral formulations of the invention include, but are not limited to, sorbitol, saccharin, saccharin sodium, aspartame, fructose, isomalt, maltitol, maltose, mannitol, sucrose, xylitol, glycerin, and their mixtures. While the amount of sweetening agents in formulations of embodiments of the invention, when present, may vary, in some instances the amount is from 0.01 to 2.0%, such as from 0.1 to 1.0% by weight of the total composition.

Suitable dyes that may be present in oral formulations of the invention include, but are not limited to, Patent Blue, quinoline yellow, orange G and mixtures thereof.

Oral formulations of embodiments of the invention may be prepared by methods known to those of skill in the art, including by combining or mixing the components according to generally accepted procedures. By way of example, the selected components may be simply mixed in a blender or other standard mixing machine to produce a concentrated composition which is then adjusted to the final concentration by the addition of water.

In embodiments where the formulation is an oral formulation, e.g., mouthwash, gargle or spray, the amount of such formulation administered at a given dosing event may vary, as desired. For example, where the oral formulation is a mouthwash or gargle, the amount of the mouthwash or gargle that is administered may, in some instances, range from 3 to 50 ml per unit dose, such as 20 ml per unit dose, and may be dosed 1 to 6 times a day, such as 1 to 4 times a day, e.g., 1 to 2 times a day. The unit dose of the mouthwash or gargle may be used by mixing in the mouth and/or gargling for a suitable period of time, e.g., 10 second to 2 minutes, such as 15 second to 1 minute, e.g., for 30 seconds. Where the oral formulation is a spray, the amounts of a given unit dose may vary, ranging in some instances from 1 to 30 ml, such as 3 to 20 ml. The dosing schedule for a spray may be analogous to that for mouthwashes and gargles, e.g., as reviewed above.

Where the aerodigestive mucosal delivery site is the nasal cavity, any convenient nasal delivery formulation may be employed. Nasal formulations of interest include, but are not limited to nasal sprays, nasal drops, nasal creams, etc. Nasal delivery formulations employed in embodiments of the invention may include a cysteamine active agent in an isotonic composition. In such formulations, the isotonicity of the composition may generally be achieved and maintained using sodium chloride or another pharmaceutically acceptable isotonicity agent, such as, for example, dextrose, boric acid, sodium tartrate, other organic or inorganic solutes and mixtures thereof. The isotonicity agent is typically present in the composition in a concentration sufficient to cause the osmolarity of the composition to be from about 280 mOsmols to about 290 mOsmols.+-.50 mOsmols. Sodium chloride is employed in some instances, such as where a buffer containing sodium ions is used in the composition, and it may be present in an amount that is physiologically equivalent to the tonicity of the nasal membranes.

Nasal delivery formulations of embodiments of the invention may further include a pharmaceutically acceptable buffer in order to maintain the desired pH. Non-limiting examples of suitable buffers used to adjust and maintain the pH of the composition include acetate, citrate, prolamine, phosphate, carbonate, phthalate, borate, or other pharmaceutically acceptable buffers and mixtures thereof. The pH of the composition is maintained generally to be compatible with the fluids of the nasal membrane in order to minimize irritation. For example, the composition may be maintained at a pH from 3 to 11. In one embodiment, the composition may be maintained at a pH from 3 to 6.5, such as from 4 to 6.5, including from 5 to 6.5, e.g., from 6 to 6.5, such as 6.5. The concentration of the buffer in the composition will depend upon the selection of the buffer and the desired pH.

Nasal delivery formulations may further include various pharmaceutically acceptable additives such as tolerance enhancers (sometimes more specifically referred to as humectants), absorption enhancers (sometimes also referred to as surfactants), preservatives, viscosity modifying agents (e.g., thickening agents), osmolarity adjusters, complexing agents, stabilizers, solubilizers, or any combination thereof.

A tolerance enhancer may be used in order to inhibit drying of the nasal membrane or mucosa. A tolerance enhancer may also serve the purpose of inhibiting or relieving irritation of the nasal membranes. Examples of suitable tolerance enhancers include, for example, humectants such as sorbitol, propylene glycol, glycerol, glycerin, hyaluronan, aloe, mineral oil, vegetable oil, soothing agents, membrane conditioners, sweeteners, and mixtures thereof. The selection and concentration of a tolerance enhancer may depend on a number of factors, including, for example, the type and concentration of cobalamin compound being used in the composition. When used, the concentration of the tolerance enhancer in the composition may vary, and in some embodiments ranges in amounts from 0.01% w/w to 20% w/w.

A surfactant (surface-active agent) or absorption enhancer may also be present in nasal delivery formulations of embodiments of the invention. Suitable absorption enhancers include non-ionic, anionic, and cationic surfactants. Any of a number of well-known surfactants may be used, including, for example, polyoxyethylene derivatives of fatty acids, partial esters of sorbitol anhydrides, sodium lauryl sulfate, sodium salicylate, oleic acid, lecithin, dehydrated alcohol, Tween (e.g., Tween 20, Tween 40, Tween 60, Tween 80 and the like), Span (e.g., Span 20, Span 40, Span 80 and the like), polyoxyl 40 stearate, polyoxy ethylene 50 stearate, edetate disodium, propylene glycol, glycerol monooleate, fusieates, bile salts, octoxynol and combinations thereof. When used, the concentration of the surfactant in the composition may vary, and in some instances ranges from 0.1% w/w to 50% w/w.

A pharmaceutically acceptable thickening (i.e., viscosity enhancing) agent may also be used in the nasal delivery formulations of embodiments of the invention in order to modify the viscosity of the composition, for example, to enhance the opportunity for the virus to make or sustain contact with the active ingredient in the formulation, e.g., cysteamine, cystamine or phosphocysteamine, prior to cell entry or attempting cell entry. Numerous pharmaceutically acceptable thickening agents are well-known and include, for example, glycerin, methyl cellulose, xanthan gum, carboxymethyl cellulose, carboxymethylcellulose sodium (i.e., croscarmellose), carboxymethylcellulose low viscosity, hydroxypropyl cellulose, carbomer, polyvinyl alcohol, alginates, acacia, dextran, chito sans and combinations thereof. The concentration of the thickening agent, when present, will depend upon the agent selected and the viscosity desired. In some embodiments, such agents may be present in the composition at a concentration of ranging from 0.1% w/w to 20% w/w, such as 0.2 t o 5% w/w. The amount of thickening agent may, in some instances, be present in an amount that provides for a formulation having a viscosity at 20° C. ranging from 1 to 3000 cP, such as 1.5 to 1000 cp, e.g., 6 cp. In some instances, the amount of viscosity enhancing agent, e.g., croscarmellose, ranges from 1 to 25 mg/ml, such as 5 to 15 mg/ml.

Where desired, a preservative may also be employed to increase the shelf-life of the composition. A number of well-known and pharmaceutically acceptable preservatives may be used in the present composition, including, for example, parabens, thimerosal, chlorobutanol, benzalkonium chloride, or benzyl alcohol and combinations thereof. Other ingredients, which extend shelf life, can be added such as for example, antioxidants. Examples of antioxidants include sodium metabisulfite, potassium metabisulfite, ascorbyl palmitate and other pharmaceutically acceptable antioxidants. When present, the antioxidant may be present in the composition in a suitable concentration, such as a concentration ranging from 0.01% w/w to 5% w/w.

Nasal formulations of embodiments of the invention may be prepared by methods known to those of skill in the art, including by combining or mixing the components according to generally accepted procedures. By way of example, the selected components may be simply mixed in a blender or other standard mixing machine to produce a concentrated composition, which is then adjusted to the final concentration by the addition of water.

Where desired, nasal formulations may be stored in and dispensed from a sealed container equipped with a metering valve and pump capable of being actuated to deliver or emit an aerosol (e.g., mist or spray) of the composition of predetermined volume into the patient's nostril and having a suitable droplet size distribution as known to those skilled in the art. Generally, the size of the droplets is large enough to prevent them from passing directly through the nasal passages and into the lungs, but small enough that they do not coalesce into large drops which either run out of the nose or down into the throat.

Suitable containers and metering valves for dispensing the nasal formulations according to the methods of the invention are available commercially and are known to those of skill in the art. The container and valve system used to deliver the composition may incorporate any of the conventional aerosol formation techniques. These include, for example, mechanical pumps; compressed air mechanisms in which delivery is made by hand pumping air into the container; compressed gas techniques in which delivery is made by the controlled release of a compressed gas (such as, for example, carbon dioxide, nitrogen, and dinitrogen oxide) into the cobalamin containing composition; and liquid propellant techniques in which a low boiling liquid hydrocarbon (such as, for example, butane, isobutane, propane, and other low boiling hydrocarbons in either pure or mixed forms), halohydrocarbon, fluorocarbons (such as, for example, FC-152A), chlorofluorocarbons (such as Freon™ or Freon™ like fluorocarbons, such as, for example, CFC-11, CFC-12 and CFC-114), and hydrofluorocarbons, also referred to as hydrofluoroalkanes (such as, for example, HFA-134a and HFA-227) are vaporized to exert a pressure and force the composition through the metering valve.

In embodiments where the formulation is a nasal formulation, the amount of such formulation administered at a given dosing event (i.e., unit dose) may vary, as desired. For example, the amount of the nasal formulation that is administered may, in some instances, range from 0.5 to 10 ml per unit dose, such as 1.0 ml per unit dose, per nares, and may be dosed 1 to 12 times a day, for example 1 to 6 times a day, such as 1 to 4 times a day, e.g., 1 to 2 times a day. It is understood that the volume will also depend upon the patient's size, with smaller doses employed to treat children based on patient's surface area as a fraction of normal adult surface area (1.7 $m^2$). In some instances, different types of nasal formulations may be administered in a given treatment regiment, e.g., nasal drops may be administered first, followed by administration of a nasal spray, or vice versa, etc.

In some embodiments, methods of at least reducing the possibility that a subject will suffer from severe COVID-19 may be employed. Patients with COVID-19 are considered to have severe illness, i.e., sever COVID-19, if they have $SpO_2$<94% on room air at sea level, a respiratory rate >30 breaths/min, a ratio of arterial partial pressure of oxygen to fraction of inspired oxygen ($PaO_2/FiO_2$) <300 mm Hg, or lung infiltrates >50%. As methods of these embodiments at least reduce the possibility that a subject will suffer from COVID-19, the methods reduce the likelihood that a subject suspected of having or having COVID-19 will progress to severe COVID-19. In some instances, embodiments of the invention, e.g., as described above, prevent a subject from suffering from severe COVID-19, e.g., by preventing a subject from having COVID-19 or from progressing to severe COVID-19.

In some embodiments, methods are provided for the treatment, mitigation, or prevention of viral infection by the co-administration of cysteamine with one or more additional therapeutics or therapies (e.g., for the treatment of viral infection (e.g., SARS-CoV-2), for treatment of COVID-19, etc.).

In some embodiments, cysteamine is co-administered with a suitable antiviral agent. Exemplary, although non-limiting, antiviral agents may be selected from abacavir, acyclovir, adefovir, amantadine, ampligen, amprenavir, arbidol, atazanavir, atripla, balavir, baloxavir marboxil, biktarvy, boceprevir, cidofovir, cobicistat, combivir, daclatasvir, darunavir, delavirdine, descovy, didanosine, docosanol, dolutegravir, doravirine, ecoliever, edoxudine, efavirenz, elvitegravir, emtricitabine, enfuvirtide, entecavir, etravirine, famciclovir, favipravir fomivirsen, fosamprenavir, foscarnet, fosfonet, a fusion inhibitor, ganciclovir, ibacitabine, ibalizumab, idoxuridine, imiquimod, imunovir, indinavir, inosine, an integrase inhibitor, interferon type i, interferon type ii, interferon type iii, interferon, lamivudine, letermovir, lopinavir, loviride, maraviroc, methisazone, moroxydine, nelfinavir, nevirapine, nexavir, nitazoxanide, norvir, nucleoside analogues, oseltamivir, peginterferon alfa-2a, peginterferon alfa-2b, penciclovir, peramivir, pleconaril, podophyllotoxin, a protease inhibitor, pyramidine, raltegravir, remdesivir, a reverse transcriptase inhibitor, ribavirin, rilpivirine, rimantadine, ritonavir, saquinavir, simeprevir, sofosbuvir, stavudine, a synergistic enhancer, telaprevir, telbivudine, tenofovir alafenamide, tenofovir disoproxil, tenofovir, tipranavir, trifluridine, trizivir, tromantadine, truvada, valaciclovir, valganciclovir, vicriviroc, vidarabine, viramidine, zalcitabine, zanamivir (relenza), zidovudine, etc.

In some embodiments, cysteamine is co-administered with a combination of lopinavir and ritonavir. In some embodiments, cysteamine is co-administered with alpha-interferon. In some embodiments, cysteamine is co-administered with an oral combination of lopinavir and ritonavir and nebulized alpha-interferon.

In some embodiments, cysteamine is co-administered with umifenovir.

In some embodiments, cysteamine is co-administered with hydroxychloroquine.

In some embodiments, cysteamine is co-administered with remdesivir.

In some embodiments, cysteamine is co-administered with glucocorticoids (e.g., high doses of glucocorticoids).

In some embodiments, cysteamine is co-administered with one or more suitable immunosuppressant drugs. Exemplary, although non-limiting, immunosuppressant drugs may be selected from corticosteroids (e.g., prednisone, budesonide, prednisolone, etc.), janus kinase inhibitors (e.g., tofacitinib, etc.), calcineurin inhibitors (e.g., cyclosporine, tacrolimus, mTOR inhibitors (e.g., sirolimus, everolimus, etc.), IMDH inhibitors (e.g., azathioprine, leflunomide, mycophenolate, etc.), biologics (e.g., abatacept, adalimumab, anakinra, certolizumab, etanercept, golimumab, infliximab, ixekizumab, natalizumab, rituximab, secukinumab, tocilizumab, ustekinumab, vedolizumab, etc.), monoclonal antibodies (e.g., basiliximab, daclizumab), etc.), etc.

In some instances, cysteamine is incorporated into a face mask. In such instances, cysteamine or compositions comprising the same (e.g., a cysteamine solution) may be employed with any type of face mask of interest. Face masks with which compositions of the invention may be employed include both sterile and non-sterile facemasks. In some instances, the facemasks are formed of a panel, such as flat, rectangular panel, of a filtering material, e.g., fabric, which covers at least a portion of the face of the wearer, e.g., the mouth and/or nose of the wearer, with loops, ties or strings attached to the corners of the rectangular panel, e.g., to secure the mask to the face by interaction with the ears, tying behind the head, etc. In some instances, the face masks are surgical face masks. In some instances, association of cysteamine with the mask greatly improves the mask effectiveness in preventing SarsCoV2 infection. A cysteamine composition, e.g., solution, such as a nasal solution, could be sprayed onto a mask, e.g., at or before the time of use, or incorporated into a mask, e.g., such as made with cysteamine in the mask fabric, sealed in a moisture proof bag until use, and then discarded. Such embodiments when employed with nasal compositions may, in some instances, reduce the number of cysteamine nasal administrations, e.g., nose sprays, required per day, and they could be used as PPE in areas where the endemic rate is high, and be employed by health care workers until vaccination is available.

In some embodiments, methods are provided for testing, assessing, quantifying, qualifying, evaluating, etc. one or more signs, symptoms, biomarkers, etc. of SARS-CoV-2 infection, COVID-19, etc. Any techniques described herein (e.g., chest x-ray, qPCR, ELISA, etc.) for the detection of biomarkers, symptoms, etc. are within the scope herein.

In some embodiments, methods herein comprise testing a subject for the presence of one or more symptoms and/or biomarkers of SARS-CoV-2 infection, COVID-19, etc. and then administering a dose of cysteamine (or co-administering) based on the results of the testing.

In some embodiments, methods herein comprise administering a dose of cysteamine and subsequently testing a subject for the presence of one or more symptoms and/or biomarkers of SARS-CoV-2 infection, COVID-19, CRS, etc. and to determine the success of the treatment.

In some embodiments, provided herein are multiple rounds of testing and treating (e.g., test-treat-test, treat-test-treat, etc.).

Some embodiments herein comprise a step of identifying a subject as being infected with SARS-CoV-2 using a suitable assay or kit. In particular embodiments, a PCR-based assay is used to test a biological sample (e.g., blood, saliva, etc.) from a subject for SARS-CoV-2 infection.

Some embodiments herein comprise performing one or more tests to assess whether a subject suffers from COVID-19. In some embodiments, one or more tests is performed to determine if a subject is critically ill with COVID-19, not critically ill but at high risk for disease advancement, not critically ill and at low risk for disease advancement, suffering from mild COVID-19, suffering from moderate COVID-19, suffering from severe COVID-19, etc. In some embodiments, a treatment course of action (e.g., comprising administering cysteamine) is selected based on testing using the assays, biomarkers, symptoms, etc. described herein. In some embodiments, the efficacy/success of a treatment course of action (e.g., comprising administering cysteamine) is measured/assessed based on testing using the assays, biomarkers, symptoms, etc. described herein. Any assays, biomarkers, or symptoms described herein may be used in embodiments herein to determine a treatment course of action (e.g., whether to administer cysteamine, dose/regimen of cysteamine, what to co-administer with cysteamine, etc.) and/or assess the success of a treatment (e.g., whether to continue/discontinue, whether to alter dose, whether to begin/continue/discontinue a co-therapy, etc.).

EXPERIMENTAL

I. Cysteamine has Nearly 100% Efficacy in Preventing SARS-CoV-2 Infection in Huh-7 Cells

A. Methods and Results

Figure 2A:
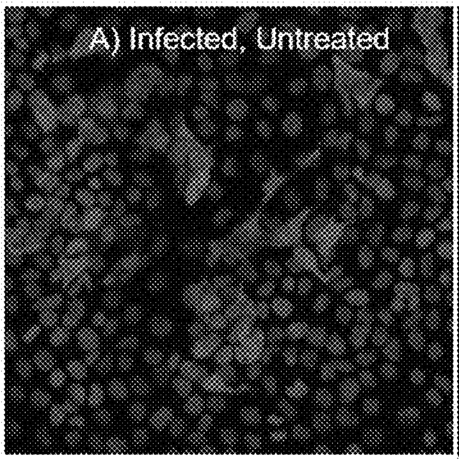
FIGS. 2A-B. Bioimaging of Huh-7 cells (A) infected with SARS-CoV-2, and (B) uninfected.
Figure 2B:
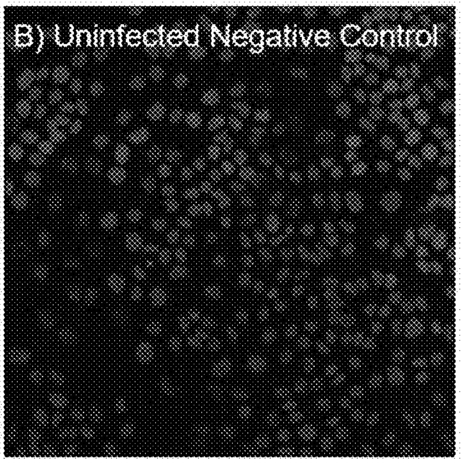
Figure 3A:
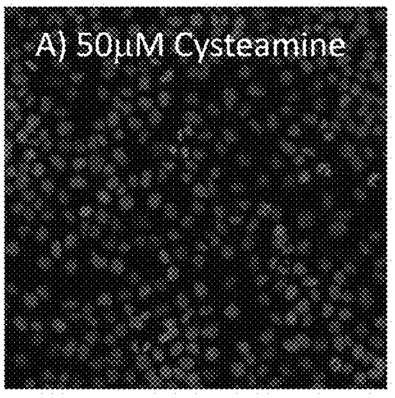
FIGS. 3A-D. Cysteamine efficacy in the Huh7 cellular infectivity assay with SARS-CoV-2-WA1 strain. Cells are infected at 0.2 MOI and are incubated for 48 hours to allow for the initial infection and propagation to surrounding cells. A) 50 micromolar cysteamine shows 100% elimination of SARS-CoV-2 infection, B) 20 micromolar shows a small percentage of infected cells that have a diminished nucleocapsid staining indicating cysteamine is acting to inhibit viral replication, C) 8 micromolar cysteamine shows reduced viral infection relative to the negative control but syncytia become present and viral staining is increased, D) Concentration response curve for cysteamine with a ~5 micromolar EC50 (concentration at 50% effect). All concentrations of cysteamine (50, 20, 8, 3, 1.5 micromolar) tested were non-cytotoxic indicating an acceptable therapeutic index.
Figure 3D:
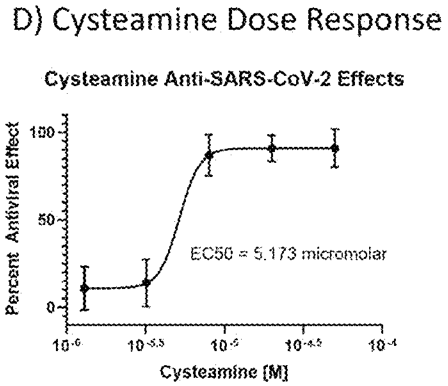
Figure 3B:
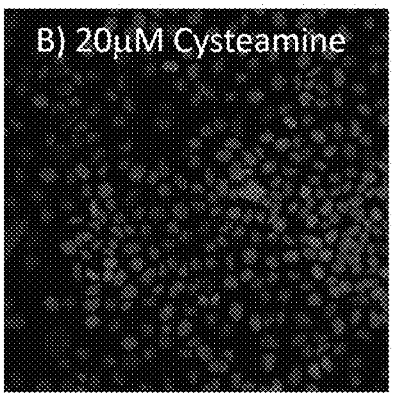
Figure 3C:
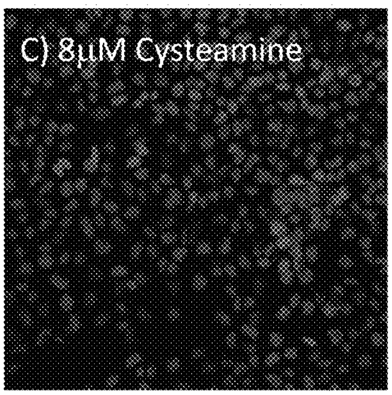

Experiments were conducted during development of embodiments herein using a fully developed high-content screening pipeline to screen approved drugs against SARS Cov-2, the causative agent of COVID-19. A high throughput screen of FDA-approved drugs was conducted to determine the efficacy in a SARS-CoV-2 infectivity assay. This high content bioimaging-based assay has proven to be highly robust and informative, and clearly differentiates between infected and uninfected cells (FIG. 2). This high-content screen identifies individual agents effective in reducing viral infectivity or replication by imaging individual SARS Cov-2 infected cells. A screen of 1,200 compounds was conducted through the validated assay platform. Remdesivir, a viral replication inhibitor, was selected as a positive control, which results in 100% efficacy.

Experiments conducted during development of embodiments herein using the validated assay demonstrate that cysteamine has nearly 100% efficacy in preventing SARS-CoV-2 infection in Huh-7 cells (FIG. 3). Cysteamine was evaluated for its antiviral effects at 5 doses with 9 replicates at each dose for a total of 45 independent experiments. Automated image analysis was performed to quantitate the number and percentage of infected cells and that was normalized to the infected and vehicle (DMSO) treated wells and the uninfected and vehicle treated wells representing 0-100% efficacy, as shown on the y-axis dose response plot for cysteamine anti-SARS-CoV-2 (FIG. 3).

B. References

The following references are herein incorporated by reference in their entireties.

(1) Prescott, L. F., R. W. Newton, C. P. Swainson, N. Wright, A. R. W. Forrest, and H. Matthew. 1974. Successful treatment of severe paracetamol overdosage with cysteamine. Lancet. 1: 588-592.)

(2) Thoene J G, Oshima R G, Crawhall J C, Olson D L, Schneider J A. Cystinosis. Intracellular cystine depletion by aminothiols in vitro and in vivo. J Clin Invest. 1976 July; 58(1):180-9. PubMed PMID: 932205; PubMed Central PMCID:PMC333169.)

(3) Gahl W A, Reed G F, Thoene J G, et al. Cysteamine therapy for children with nephropathic cystinosis. N Engl J Med. 1987; 316(16):971-977. doi:10.1056/NEJM198704163161602

(4) Corden B J, Schulman J D. Schneider J A, Thoene J G. Adverse reactions to oral cysteamine use in nephropathic cystinosis. Dev Pharmacol Ther 1981; 3:25-30.

(5) Wenner W J, Murphy J L: The effects of cysteamine on the upper gastrointestinal tract of children with cystinosis. Pediatr Nephrol 11:600, 1997. [9323287

6) Krischock L, Horsfield C, D'Cruz D, Rigden S P. Drug-induced lupus and antiphospholipid syndrome associated with cysteamine therapy. Nephrol Dial Transplant. 2009

June; 24(6):1997-9. doi: 10.1093/ndt/gfp128. Epub 2009 Mar. 26. PubMed PMID: 19324914.

7) Ahmad Z P, Johnstone L M, Walker A M. Cystinosis and lupus erythematosus: coincidence or causation. Pediatr Nephrol. 2010 August; 25(8):1543-6. doi: 10.1007/s00467-010-1470-9. Epub 2010 Feb. 27. Review. PubMed PMID: 20191368.

8) 416. Besouw M T, Bowker R, Dutertre J P, Emma F, Gahl W A, Greco M, Lilien M R, McKiernan J, Nobili F, Schneider J A, Skovby F, van den Heuvel L P, Van't Hoff W G, Levtchenko E N. Cysteamine toxicity in patients with cystinosis. J Pediatr. 2011 December; 159(6):1004-11. doi: 10.1016/j.jpeds.2011.05.057. Epub 2011 Jul. 23. PubMed PMID: 21784456.

II. In Vitro Activity of Cysteamine Against SARS-CoV-2 Variants Alpha, Beta, Gamma and Delta A. Methods:

Viral stocks were expanded, sequenced to ensure fidelity to the parent stock, and aliquots incubated at 37° C. with the indicated concentration of cysteamine HCL for the indicated time. After incubation, the virus was added to cultured TMPRSS cells, and assessed for plaque formation by visual inspection after 72 h. All procedures were performed under BSL3 conditions.

Figure 4:
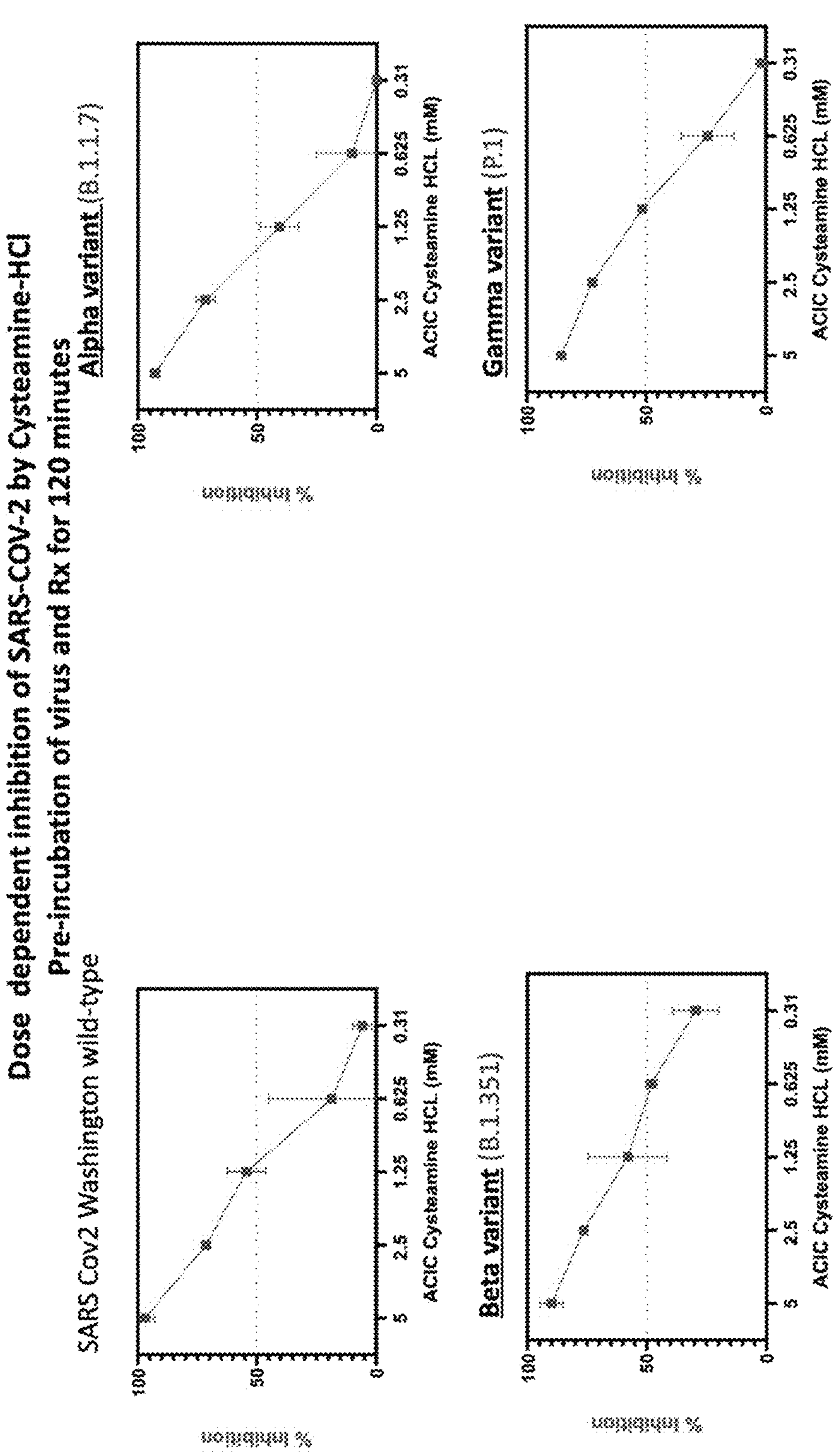
FIGS. 4, 5, and 6 provide results showing in vitro activity of cysteamine against SARS-CoV-2 Variants Alpha, Beta, Gamma and Delta. There is near complete inactivation of the variants at 10 mM and 15-90 minutes exposure.
Figure 5:
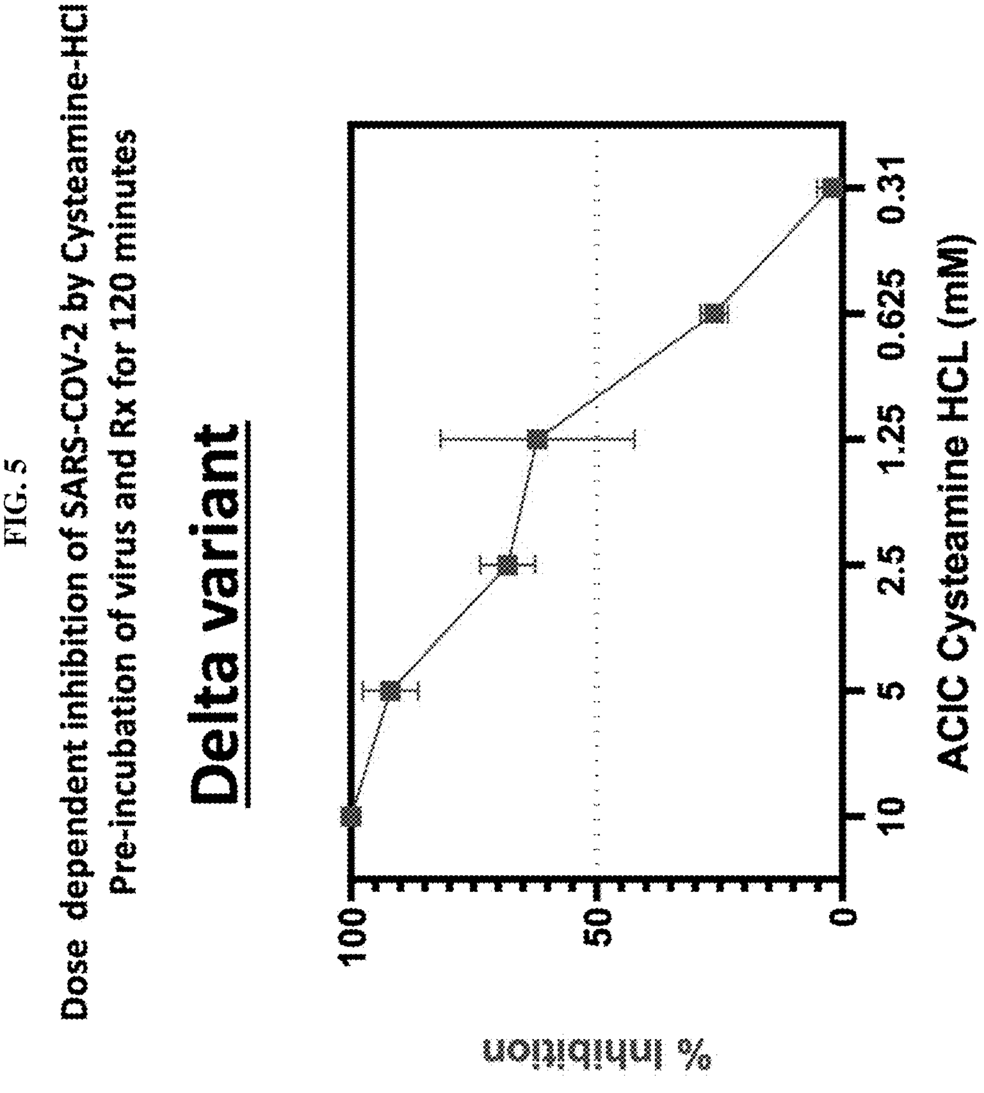
Figure 6:
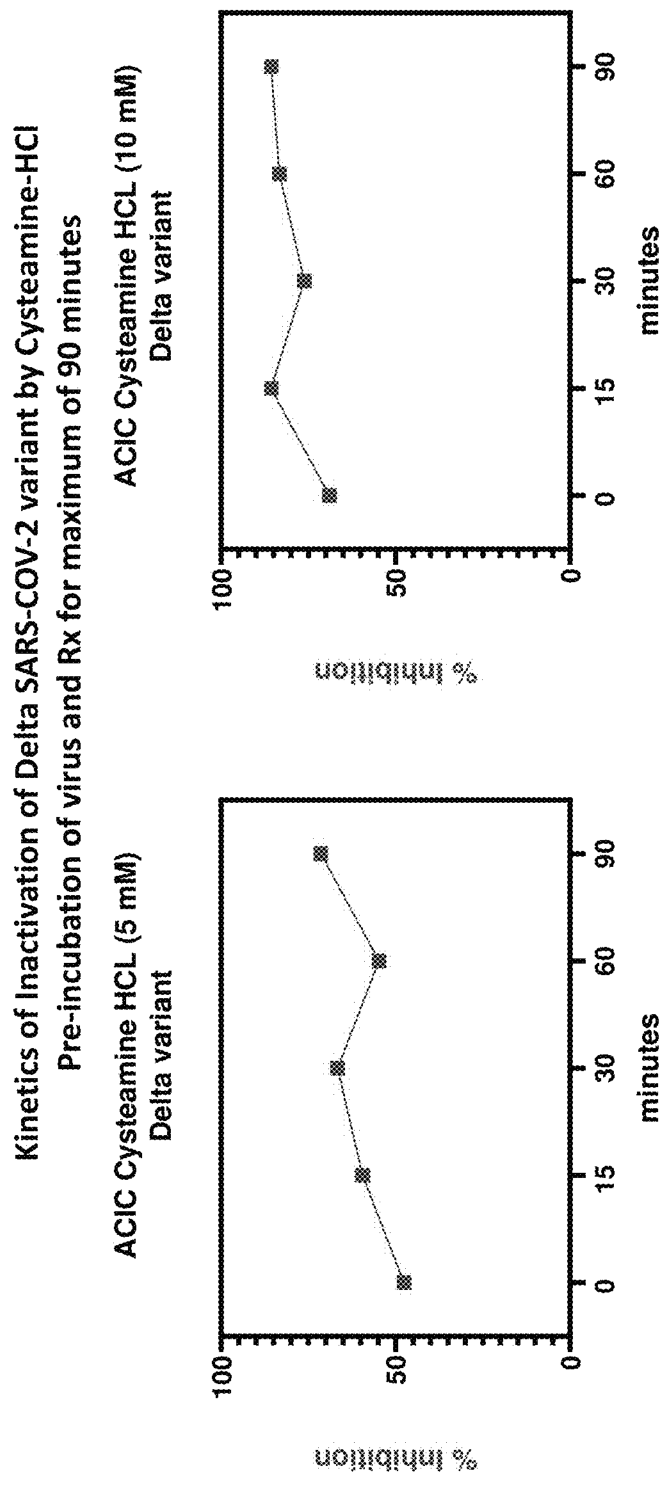

B. Results:

The results are shown in FIGS. 4 to 6.

C. Discussion:

As seen in FIG. 4, the WA wild type and SARS-CoV-2 variants alpha, beta, and gamma are inhibited by 85 to 95% after 120 min incubation by 5 mM cysteamine HCl. The Delta variant, as seen in FIG. 5, is inhibited to 100% at 10 mM cysteamine HCl under the same conditions. Study of the kinetics of inhibition of the Delta variant by 5 or 10 mM cysteamine HCl, shows that, at 10 mM, 85% inhibition is reached after 15 min of incubation, and this is sustained through 90 minutes of incubation. As noted, 100% inhibition is achieved with 10 mM cysteamine HCl at 120 minutes of incubation.

1. Mechanism of Action of Cysteamine in Cystinosis:

Lysosomal cystine storage increases the rate of apoptosis in cultured cystinotic fibroblasts and proximal renal tubule cells, and this increase in apoptosis is alleviated by treatment with cysteamine which normalizes the lysosomal cystine content (Park M A, Pejovic V, Kerisit K G, Junius S, Thoene J G. Increased apoptosis in cystinotic fibroblasts and renal proximal tubule epithelial cells results from cysteinylation of protein kinase Cdelta. J Am Soc Nephrol. 2006;17(11):3167-3175. doi:10.1681/ASN.2006050474; Park M, Helip-Wooley A, Thoene J. Lysosomal cystine storage augments apoptosis in cultured human fibroblasts and renal tubular epithelial cells. J Am Soc Nephrol. 2002;13(12):2878-2887. doi:10.1097/01.asn.0000036867.49866.59). Cysteamine enters lysosomes via a specific lysosomal transport system (Pisoni R L, Park G Y, Velilla V Q, Thoene J G. Detection and characterization of a transport system mediating cysteamine entry into human fibroblast lysosomes. Specificity for aminoethylthiol and aminoethylsulfide derivatives. J Biol Chem. 1995; 270(3):1179-1184. doi:10.1074/jbc.270.3.1179), where it undergoes a disulfide exchange reaction with cystine, leading to formation of the cysteamine-cysteine mixed disulfide, which then exits the lysosomes via the intact lysine transporter, with which the mixed disulfide is homologous (Pisoni R L, Thoene J G, Christensen H N. Detection and characterization of carrier-mediated cationic amino acid transport in lysosomes of normal and cystinotic human fibroblasts. Role in therapeutic cystine removal?. J Biol Chem. 1985; 260(8):4791-4798).

2. Mechanism of Action of Cysteamine in HIV Infection:

Cysteamine has activity in vitro against HIV. A coat protein of HIV, gp120, which is essential for viral entry has 10 disulfide bonds (Barbouche R, Miquelis R, Jones I M, Fenouillet E. Protein-disulfide isomerase-mediated reduction of two disulfide bonds of HIV envelope glycoprotein 120 occurs post-CXCR4 binding and is required for fusion. J Biol Chem. 2003; 278(5):3131-3136. doi:10.1074/jbc.M205467200). Cysteamine reduces these bonds, potentially altering the tertiary protein structure and impeding gp120 binding to CD4 lymphocytes and thus decreasing the cytopathic effect (Anderson R A Jr, Feathergill K, Kirkpatrick R, et al. Characterization of cysteamine as a potential contraceptive anti-HIV agent. J Androl. 1998; 19(1):37-49; Barbouche R, Miquelis R, Jones I M, Fenouillet E. Protein-disulfide isomerase-mediated reduction of two disulfide bonds of HIV envelope glycoprotein 120 occurs post-CXCR4 binding and is required for fusion. J Biol Chem. 2003; 278(5):3131-3136. doi:10.1074/jbc.M205467200). Cysteamine has also been shown to inhibit HIV replication (Bergamini A, Ventura L, Mancino G, et al. In vitro inhibition of the replication of human immunodeficiency virus type 1 by beta-mercaptoethylamine (cysteamine). J Infect Dis. 1996; 174(1):214-218. doi:10.1093/infdis/174.1.214).

3. Mechanism(s) of Action in SARS-CoV2:

The spike protein of the COVID19 virus has 13 disulfide bonds (Ibrahin Ibrahim, Doaa Abdelmalek, Mohamed Elshahat, Abdo Elfiky COVID-19 Spike-Host Cell receptor GRP78 binding site prediction Preprint: DOI https://dx.doi.org/10.21203/rs.2.24599/v1). It is probable that cysteamine reduces some of those bonds, leading to altered spike protein conformation, and thereby inhibiting binding of the virus to the ACE2 receptors on the cell surface (Yan R, Zhang Y, Li Y, Xia L, Guo Y, Zhou Q. Structural basis for the recognition of SARS-CoV-2 by full-length human ACE2. Science. 2020;367(6485):1444-1448.). This mechanism was recently well reviewed (Kritika Khanna, Wilfred Raymond, Annabelle R. Charbit, Jing Jin, Irina Gitlin, Monica Tang, Hannah S. Sperber, Sergej Franz, Satish Pillai, Graham Simmons, John V. Fahy Binding of SARS-CoV-2 spike protein to ACE2 is disabled by thiol-based drugs; evidence from in vitro SARS-CoV-2 infection studies. bioRxiv preprint doi: https://doi.org/10.1101/2020.12.08.415505.). Because the disulfide sequences are highly conserved in order for the RBD of the S protein to remain recognized by ACE2, it is not surprising that all four variants respond equally well to inhibition by cysteamine (See FIGS. 4 to 6). None of the reported mutations in this virus alter a cysteine residue. Any mutation which did alter a cysteine residue, thereby eliminating the associated disulfide bond, would reduce the affinity of the spike protein for the ACE2 receptor, and thus reduce reproductive fitness of that variant.

The nasal epithelium is a target for SARSCoV-2 to enter and replicate via the concentrated ACE2 receptors on goblet cells (Sungnak W, Huang N, Bécavin C, et al. SARS-CoV-2 entry factors are highly expressed in nasal epithelial cells together with innate immune genes. Nat Med. 2020; 26(5):681-687. doi:10.1038/s41591-020-0868-6). As the virus proliferates in the nasal epithelium, lysis of epithelial cells releases virions in a logarithmic progression which then transit to the trachea, bronchi and ultimately alveoli, leading to pneumonia, devastating illness (Hou Y J, Okuda K, Edwards C E, Martinez D R, Asakura T, Dinnon K H 3rd, Kato T, Lee R E, Yount B L, Mascenik T M, Chen G, Olivier K N, Ghio A, Tse L V, Leist S R, Gralinski L E, Schafer A, Dang H, Gilmore R, Nakano S, Sun L, Fulcher M L, Livraghi-Butrico A, Nicely N I, Cameron M, Cameron C, Kelvin D J, de Silva A, Margolis D M, Markmann A, Bartell L, Zumwalt R, Martinez F J, Salvatore S P, Borczuk A, Tata P R, Sontake V, Kimple A, Jaspers I, O'Neal W K, Randell S H, Boucher R C, Baric R S. SARS-CoV-2 Reverse Genetics Reveals a Variable Infection Gradient in the Respiratory Tract. Cell. 2020 Jul. 23; 182(2):429-446.e14. doi: 10.1016/j.ce11.2020.05.042. Epub 2020 May 27. PMID: 32526206; PMCID: PMC7250779), and markedly greater infectivity, as measured by $R_{R1}$ (I to K, Piantham C, Nishiura H. Predicted dominance of variant Delta of SARS-CoV-2 before Tokyo Olympic Games, Japan, July 2021. Euro Surveill. 2021 July; 26(27):2100570. doi: 10.2807/1560-7917.ES.2021.26.27.2100570. PMID: 34240695; PMCID: PMC8268651). Therefore eliminating or reducing the viral load in the nasal epithelium should have a highly salutary effect on the course of the disease and its transmission.

Currently available vaccines are effective at preventing illness associated with this virus. However, these vaccines have been shown to be less effective at preventing infection, replication, transmission (and presumably mutation) of the virus from a vaccinated individual to others. As demonstrated by development of the attenuated, live-virus, nasally administered by FluMist® vaccine, development and approval of a nasally administered vaccine, which could perhaps be effective in preventing or reducing viral infection, loads and shedding from the nasopharynx is likely to be many years away.

The Delta variant is believed to result in significantly higher viral loads in the nasopharynx than the original virus, thus providing significantly greater opportunities for viral spread and mutation. At this time, controlling the spread and mutation of SARSCoV2 may not be achieved via the currently available vaccines. In addition to vaccination, one should consider how to prevent infection, replication, mutation and spread of the virus including among vaccinated individuals. One method would be nasal administration of a compound such as cysteamine to disrupt the virus at its point of infection and incubation. Reducing or eliminating the virus's ability to infect nasal epithelial cells would not only reduce its ability to produce illness in infected individuals, but also reduce or eliminate its ability to replicate, mutate and infect others. Of concern is the kinetics of viral inactivation by this agent. At 10 mM cysteamine, 100% inactivation is achieved at 120 min. (FIG. 5), and 85% inactivation is found at 15 minutes (FIG. 6).

Since cysteamine is currently approved as the topical ophthalmic preparations, Cystaran® (0.44%, =56 mM), and Cystadrops® (0.37%, =33 mM) the drug could readily be employed topically to the nasal epithelium where it could act as a chemical impediment to nasal entry and thus to viral replication. Frequent (QID) administration of a 10 mM solution of cysteamine to the nasal cavities will yield a chemical impediment, which in tissue culture inactivates 85-100% of the virus contingent on the time of exposure to the agent and its concentration. It is feasible that if the viral propagation is diminished in the epithelium by the presence of cysteamine, emergence of infectious virions from lysis of the cells which are first infected might be decreased, thereby diminishing contagion, and possibly reducing the severity of the illness. It could therefore prevent infection, mitigate disease development, and decrease the spread of disease from immunized, but infectious patients, including asymptomatic individuals. Since this dose is 20% of the concentration of cysteamine in the FDA approved eye drops, which are administered lifelong on an hourly to QID basis, this preparation should be well tolerated. The nasal epithelium of patients on cysteamine eye drops receives a near constant exposure to the drug via the nasal-lacrimal duct. Nasal irritation in patients receiving cysteamine eye drops has not been reported. This compound could also be simultaneously administered as a mouth wash/gargle, to further diminish viral spread. A recent paper has shown that the viral load is much greater in patients' oral swabs than nasal swabs (Malik M, Kunze A C, Bahmer T, Herget-Rosenthal S, Kunze T. SARS-CoV-2: Viral Loads of Exhaled Breath and Oronasopharyngeal Specimens in Hospitalized Patients with COVID-19. Int J Infect Dis. 2021 Jul. 7; 110:105-110. doi: 10.1016/j.ijid.2021.07.012. Epub ahead of print. PMID: 34242768; PMCID: PMC8260556.).

D. Summary:

Cysteamine is a well-known and well-studied drug that has a good safety profile. It is currently in use by approximately 800 patients with cystinosis ranging in age from infancy to adulthood. The treatment is continued lifelong both in oral systemic form and as topical eye drops. The data herein reported demonstrate significant in vitro activity of cysteamine against SARS-CoV-2, including the rapidly spreading Delta variant. (See Figures) Delta variant infection of TMPRSS cells is inhibited 100% by 10 mM cysteamine.

Topical administration of cysteamine to the nasal mucosa may be beneficial in three ways:
1) It may act as a barrier, preventing infection of treated individuals
2) It may mitigate the effects of virus that are taken up by ACE2-expressing cells by inactivating virus as they are released from infected cells in the nasal epithelium, decreasing the amount of infectious virus available to travel deeper into the tracheo-bronchial tree
3) By decreasing the amount of infectious virus produced in the nasal epithelium it may reduce the spread of virus via exhalation by treated persons.

In at least some of the previously described embodiments, one or more elements used in an embodiment can interchangeably be used in another embodiment unless such a replacement is not technically feasible. It will be appreciated by those skilled in the art that various other omissions, additions, and modifications may be made to the methods and structures described above without departing from the scope of the claimed subject matter. All such modifications and changes are intended to fall within the scope of the subject matter, as defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

The invention claimed is:

1. A method comprising orally or nasally administering a formulation comprising an effective dose of an active agent selected from cysteamine, cystamine and phosphocysteamine to a subject infected or suspected to be infected with a coronavirus.

2. The method according to claim 1, wherein the coronavirus is severe acute respiratory syndrome coronavirus 2 (SARS-COV-2).

3. The method of claim 1, wherein the subject suffers from Coronavirus disease 2019 (COVID-19).

4. The method of claim 1, wherein the effective dose is administered orally.

5. The method of claim 1, wherein the effective dose is administered nasally.

6. The method of claim 1, wherein the active agent is co-administered with one or more additional therapeutics.

7. The method of claim 6, wherein the active agent is co-administered with one or more antiviral agents.

8. The method of claim 7, wherein the cysteamine is co-administered with one or more of lopinavir, ritonavir, umifenovir, hydroxychloroquine, remdesivir, and favipiravir.

9. The method of claim 1, wherein the formulation comprises a viscosity enhancing agent.

10. The method of claim 9, wherein the viscosity enhancing agent is present in the formulation in an amount ranging from 0.1 to 20%.

11. The method of claim 9, wherein the viscosity enhancing agent is present in the formulation in an amount ranging from 5 mg/ml to 15 mg/ml.

12. The method of claim 9, wherein the viscosity enhancing agent is selected from the group consisting of glycerin, methyl cellulose, xanthan gum, carboxymethyl cellulose, carboxymethylcellulose low viscosity, carboxymethylcellulose sodium, hydroxypropyl cellulose, carbomer, polyvinyl alcohol, alginates, acacia, dextran, chitosan, and combinations thereof.

13. The method of claim 1, wherein the formulation has a viscosity ranging from 1 to 3000 cp.

14. A method of preventing infection with severe acute respiratory syndrome coronavirus 2 (SARS-COV-2) in a subject comprising administering an effective dose of an active agent selected from cysteamine, cystamine and phosphocysteamine to the subject, wherein preventing infection with SARS-COV-2 corresponds to at least 85% inhibition of infection in TMPRSS cells incubated for 120 minutes at a concentration of cysteamine of 5 mM to 10 mM.

15. The method of claim 14, wherein the active agent is administered to the nasal cavity of the subject.

16. The method of claim 14, wherein the active agent is administered orally to the subject.

17. The method of claim 14, wherein the active agent is formulated for topical administration.

18. The method of claim 17, wherein the topical formulation comprises a nasal cream, nasal drops, or a nasal spray.

19. The method of claim 18, wherein the formulation comprises a viscosity enhancing agent.

20. The method of claim 19, wherein the viscosity enhancing agent is present in the formulation in an amount ranging from 0.1 to 20%.

21. The method of claim 19, wherein the viscosity enhancing agent is present in the formulation in an amount ranging from 5 mg/ml to 15 mg/ml.

22. The method of claim 19, wherein the viscosity enhancing agent is selected from the group consisting of glycerin, methyl cellulose, xanthan gum, carboxymethyl cellulose, carboxymethylcellulose low viscosity, carboxymethylcellulose sodium, hydroxypropyl cellulose, carbomer, polyvinyl alcohol, alginates, acacia, dextran, chitosan, and combinations thereof.

23. The method of claim 18, wherein the formulation has a viscosity ranging from 1 to 5000 cp.

24. The method of claim 14, wherein the administering reduces the infectiveness of SARS-COV-2 entering the nasal epithelium, replicating in the nasal epithelium, and/or migrating from the nasal epithelium.

25. A method comprising administering topically a composition comprising a cysteamine active agent to an aerodigestive mucosal location of a subject infected with or suspected to be infected with severe acute respiratory syndrome coronavirus 2 (SARS-COV-2).

26. The method of claim 25, wherein the aerodigestive mucosal location of the subject is selected from the group consisting of the oral cavity, the nasal cavity, the pharynx, the nasopharynx, and combinations thereof.

27. The method of claim 25, wherein the concentration of cysteamine active agent in the composition ranges from 5 to 50 mM.

28. The method of claim 27, wherein the concentration of cysteamine active agent in the composition ranges from 7.5 to 25 mM.

29. The method of claim 28, wherein the concentration of cysteamine active agent in the composition is 10 mM.

30. The method of claim 25, wherein the cysteamine active agent is selected from the group consisting of cysteamine, cystamine or phosphocysteamine.

31. The method of claim 30, wherein the cysteamine active agent is cysteamine.

32. The method of claim 25, wherein the composition comprises a viscosity enhancing agent.

33. The method of claim 32, wherein the viscosity enhancing agent is present in the formulation in an amount ranging from 0.1 to 20%.

34. The method of claim 32, wherein the viscosity enhancing agent is present in the formulation in an amount ranging from 5 mg/ml to 15 mg/ml.

35. The method of claim 32, wherein the viscosity enhancing agent is selected from the group consisting of glycerin, methyl cellulose, xanthan gum, carboxymethyl cellulose, carboxymethylcellulose low viscosity, carboxymethylcellulose sodium, hydroxypropyl cellulose, carbomer, polyvinyl alcohol, alginates, acacia, dextran, chitosan, and combinations thereof.

36. The method of claim 25, wherein the composition has a viscosity ranging from 1 to 5000 cp.

37. The method of claim 25, wherein the composition is a mouthwash.

38. The method of claim 25, wherein the composition is a gargle.

39. The method of claim 25, wherein the composition is a nasal formulation.

40. The method of claim 39, wherein the nasal formulation is a nasal spray, nasal drop, or nasal cream.

41. The method of claim 25, wherein the method comprising administering a unit dose of the composition to the subject 1 to 12 times per day.

42. The method of claim 25, wherein the method at least reduces infection of cells by SARS-COV-2.

43. The method of claim 25, wherein the subject suffers from Coronavirus disease 2019 (COVID-19) and the method is a method of treating the subject for COVID-19.

44. The method of claim 25, wherein the subject is suspected of being infected with SARS-COV-2 and the method is a method of preventing the subject from suffering from COVID-19.

45. The method of claim 25, wherein the subject is a human.

46. The method of claim 25, wherein the cysteamine active agent is co-administered with one or more additional therapeutics.

47. The method of claim 46, wherein the cysteamine active agent is co-administered with one or more antiviral agents.

48. The method of claim 47, wherein the cysteamine active agent is co-administered with one or more of lopinavir, ritonavir, umifenovir, hydroxychloroquine, remdesivir, and favipiravir.

49. A method of at least reducing the possibility of a subject from suffering severe COVID-19 disease, the method comprising administering to the subject an amount of a cysteamine active agent sufficient to prevent the subject from suffering from severe COVID-19 disease.

50. The method of claim 49, wherein the method is a method of preventing the subject from suffering severe COVID-19 disease.

51. The method according to claim 50, the method comprises administering topically a composition comprising the cysteamine active agent to an aerodigestive mucosal location of a subject.

52. The method of claim 51, wherein the aerodigestive mucosal location of the subject is selected from the group consisting of the oral cavity, the nasal cavity, the pharynx, the nasopharynx, and combinations thereof.

53. The method of claim 52, wherein the concentration of cysteamine active agent in the composition ranges from 5 to 50 mM.

54. The method of claim 53, wherein the concentration of cysteamine active agent in the composition ranges 7.5 to 25 mM.

55. The method of claim 54, wherein the concentration of cysteamine active agent in the composition is 10 mM.

56. The method of claim 51, wherein the composition comprises a viscosity enhancing agent.

57. The method of claim 56, wherein the viscosity enhancing agent is present in the formulation in an amount ranging from 0.1 to 20%.

58. The method of claim 56, wherein the viscosity enhancing agent is present in the formulation in an amount ranging from 5 mg/ml to 15 mg/ml.

59. The method of claim 56, wherein the viscosity enhancing agent is selected from the group consisting of glycerin, methyl cellulose, xanthan gum, carboxymethyl cellulose, carboxymethylcellulose low viscosity, carboxymethylcellulose sodium, hydroxypropyl cellulose, carbomer, polyvinyl alcohol, alginates, acacia, dextran, chitosan, and combinations thereof.

60. The method of claim 51, wherein the composition has a viscosity ranging from 1 to 5000 cp.

61. The method of claim 49, wherein the cysteamine active agent is selected from the group consisting of cysteamine, cystamine or phosphocysteamine.

62. The method of claim 61, wherein the cysteamine active agent is cysteamine.

63. The method of claim 49, wherein the subject is a human.

64. The method of claim 49, wherein the cysteamine active agent is co-administered with one or more additional therapeutics.

65. The method of claim 64, wherein the cysteamine active agent is co-administered with one or more antiviral agents.

66. The method of claim 65, wherein the cysteamine active agent is co-administered with one or more of lopinavir, ritonavir, umifenovir, hydroxychloroquine, remdesivir, and favipiravir.

* * * * *